United States Patent
Nakashima et al.

(10) Patent No.: US 11,285,916 B2
(45) Date of Patent: Mar. 29, 2022

(54) VEHICLE REMOTE CONTROL SYSTEM, COMMUNICATION MODULE, VEHICLE, SERVER, VEHICLE REMOTE CONTROL METHOD, VEHICLE REMOTE CONTROL PROGRAM, AND STORAGE MEDIUM

(71) Applicant: GLOBAL MOBILITY SERVICE INC., Tokyo (JP)

(72) Inventors: Tokushi Nakashima, Tokyo (JP); Katsuyoshi Kurahashi, Tokyo (JP)

(73) Assignee: GLOBAL MOBILITY SERVICE INC., Tokyo (JP)

( * ) Notice: Subject to any disclaimer, the term of this patent is extended or adjusted under 35 U.S.C. 154(b) by 0 days.

(21) Appl. No.: 16/972,546

(22) PCT Filed: Jul. 10, 2018

(86) PCT No.: PCT/JP2018/026106
§ 371 (c)(1),
(2) Date: Dec. 4, 2020

(87) PCT Pub. No.: WO2020/012570
PCT Pub. Date: Jan. 16, 2020

(65) Prior Publication Data
US 2021/0237683 A1 Aug. 5, 2021

(51) Int. Cl.
*B60R 25/24* (2013.01)
*B60R 25/30* (2013.01)
(Continued)

(52) U.S. Cl.
CPC ............ *B60R 25/24* (2013.01); *B60R 25/305* (2013.01); *B60R 25/31* (2013.01); *B60R 25/33* (2013.01);
(Continued)

(58) Field of Classification Search
CPC ....... B60R 25/24; B60R 25/305; B60R 25/31; B60R 25/33; B60R 25/34; G07C 5/008;
(Continued)

(56) References Cited

U.S. PATENT DOCUMENTS

| | | | |
|---|---|---|---|
| 5,917,405 A | 6/1999 | Joao | |
| 6,850,153 B1 * | 2/2005 | Murakami | G08G 1/20 340/425.5 |

(Continued)

FOREIGN PATENT DOCUMENTS

| | | | |
|---|---|---|---|
| JP | 200259812 A | 2/2002 | |
| JP | 3597772 B2 | 12/2004 | |

(Continued)

OTHER PUBLICATIONS

Office Action in KR application No. 10-2020-7034794, dated Apr. 7, 2021, 24pp.

(Continued)

*Primary Examiner* — Joseph H Feild
*Assistant Examiner* — Rufus C Point
(74) *Attorney, Agent, or Firm* — Hauptman Ham, LLP

(57) ABSTRACT

A vehicle remote control system includes a communication module configured to communicate with an ECU of a vehicle and acquire vehicle information, and a server configured to compute a starting state control command for switching between a starting-disabled state and a starting-enabled state of the vehicle based on the vehicle information received from the communication module. The server computes the starting state control command and outputs the starting state control command to the communication module. The condition for switching between the starting-disabled state and the starting-enabled state of the vehicle by the communication module is that, in addition to that power of the vehicle being off, at least one of the followings is (Continued)

satisfied: (1) the vehicle is stopped; (2) the vehicle is not stopped on a public road; and (3) the vehicle is stopped at a predetermined parking area.

9 Claims, 6 Drawing Sheets

(51) Int. Cl.
 *B60R 25/31* (2013.01)
 *B60R 25/33* (2013.01)
 *B60R 25/34* (2013.01)
 *G07C 5/00* (2006.01)
 *G06Q 10/02* (2012.01)
 *G06Q 20/32* (2012.01)
 *G06Q 30/06* (2012.01)
 *G06Q 50/30* (2012.01)

(52) U.S. Cl.
 CPC ............ *B60R 25/34* (2013.01); *G07C 5/008* (2013.01); *G06Q 10/02* (2013.01); *G06Q 20/322* (2013.01); *G06Q 30/0645* (2013.01); *G06Q 50/30* (2013.01); *G06Q 2240/00* (2013.01)

(58) Field of Classification Search
 CPC .. G06Q 10/02; G06Q 20/322; G06Q 30/0645; G06Q 50/30; G06Q 2240/00
 See application file for complete search history.

(56) References Cited

U.S. PATENT DOCUMENTS

| | | | | |
|---|---|---|---|---|
| 10,438,250 | B2* | 10/2019 | Yamashiro | G07B 15/02 |
| 2006/0100777 | A1 | 5/2006 | Staton et al. | |
| 2006/0293842 | A1 | 12/2006 | Casino | |
| 2007/0136083 | A1* | 6/2007 | Simon | B60R 25/04 |
| | | | | 701/36 |
| 2008/0258890 | A1* | 10/2008 | Follmer | B60R 25/102 |
| | | | | 340/439 |
| 2012/0092190 | A1* | 4/2012 | Stefik | G08B 25/12 |
| | | | | 340/932.2 |
| 2012/0139696 | A1* | 6/2012 | McQuade | G08G 1/0962 |
| | | | | 340/5.7 |
| 2013/0024202 | A1* | 1/2013 | Harris | G06Q 40/00 |
| | | | | 705/1.1 |
| 2013/0218446 | A1 | 8/2013 | Bradley et al. | |
| 2014/0201064 | A1* | 7/2014 | Jackson | G08G 1/0175 |
| | | | | 705/38 |
| 2015/0015396 | A1* | 1/2015 | Lunstedt | H04L 67/125 |
| | | | | 340/545.1 |
| 2015/0298655 | A1* | 10/2015 | Monthel | G06Q 50/30 |
| | | | | 701/2 |
| 2016/0104135 | A1* | 4/2016 | Afeli | G06Q 20/102 |
| | | | | 705/38 |
| 2016/0350986 | A1* | 12/2016 | Oliver | G07C 5/0816 |
| 2017/0050614 | A1 | 2/2017 | Maihofer | |
| 2017/0132533 | A1* | 5/2017 | Darnell | G07C 5/008 |
| 2017/0200329 | A1 | 7/2017 | Rajakondala | |
| 2019/0202421 | A1* | 7/2019 | Healy | B60T 8/1708 |
| 2019/0206149 | A1* | 7/2019 | Sakurada | G07C 5/0825 |
| 2019/0384303 | A1* | 12/2019 | Muller | G06K 9/00791 |
| 2020/0293064 | A1* | 9/2020 | Wu | G05D 1/0246 |
| 2020/0369238 | A1 | 11/2020 | Toyooka et al. | |

FOREIGN PATENT DOCUMENTS

| | | |
|---|---|---|
| JP | 200575302 A | 3/2005 |
| JP | 2006290246 A | 10/2006 |
| JP | 2010522392 A | 7/2010 |
| JP | 4534455 B2 | 9/2010 |
| JP | 2014146120 A | 8/2014 |
| JP | 3200244 U | 10/2015 |
| JP | 6238038 B1 | 11/2017 |
| JP | 2017536285 A | 12/2017 |
| WO | 2016167350 A1 | 10/2016 |
| WO | 2017207644 A1 | 12/2017 |
| WO | 2018051752 A1 | 3/2018 |
| WO | 2018116480 A1 | 6/2018 |

OTHER PUBLICATIONS

International Search Report in PCT/JP2018/026106, dated Sep. 4, 2018. 5pp.

Office Action in BR application No. BR112020024732-4 , dated Jun. 30, 2021, 11pp.

Extended European Search Report in EP application No. 18925785.0 , dated Jan. 21, 2022, 8pp.

* cited by examiner

VEHICLE REMOTE CONTROL SYSTEM, COMMUNICATION MODULE, VEHICLE, SERVER, VEHICLE REMOTE CONTROL METHOD, VEHICLE REMOTE CONTROL PROGRAM, AND STORAGE MEDIUM

RELATED APPLICATIONS

The present application is a National Phase of International Application No. PCT/JP2018/026106 filed Jul. 10, 2018.

FIELD

The present invention relates to a vehicle remote control system for use in services that provide a vehicle equipped with a communication module with a remote control function.

BACKGROUND

In the conventional automobile distribution and leasing industry, people have been unable to obtain vehicles without passing strict finance credit screening. Nowadays, a service has been proposed to users who have the ability to pay but fail to pass a conventional credit screening. This service eliminates credit screening but provides a vehicle and, if the charge (for example, monthly fee) is not paid within a predetermined time limit, remotely stops the vehicle and specifies the position of the vehicle for vehicle retrieval.

An example of a system for implementing such a service is disclosed in Patent Literature 1, in which a vehicle is equipped with a vehicle-mounted device with a remote control function, and this vehicle-mounted device is connected to a network so that a server remotely controls the vehicle or a server acquires information on the vehicle. Such a vehicle connected to a network is called a "connected car". In this system, if the user does not pay the charge within a predetermined time limit, or if theft of the vehicle is detected, the starting of the vehicle is restricted under an instruction from the server.

Patent Literature 2 discloses a remote control system for auto loan and auto lease, in which a relay switch device is controlled such that the starting of the engine of a target vehicle is disabled when the loan payment or the lease fee is not settled, and the relay switch device is also controlled such that a lock state is entered to disable the starting of the engine when the transmission/reception antenna or the GPS antenna is removed.

Patent Literature 3 to Patent Literature 5 disclose techniques for performing control such that the starting of a vehicle is disabled by remote operation in anti-theft devices.

Patent Literature 3 discloses an antitheft system for construction machines using a satellite, in which at a point in time when a construction machine is found stolen, a stop signal is transmitted from a personal computer terminal of the manager of the construction machine to a satellite communication unit of the construction machine through a satellite, whereby the construction machine at a remote location is controlled such that the starting of the engine is disabled, or the engine is stopped, or the hydraulic operation of the machine is disabled. In addition, even if an illegal intruder succeeds in starting the engine by directly connecting the battery with the engine starter motor using a cable, the control that disables the hydraulic operation of each pilot valve prevents the construction machine from being operated.

Patent Literature 4 discloses a vehicle remote operation system in which a request signal is transmitted from a mobile phone to a communication ECU of the vehicle through a radio base station, and a remote ECU that receives the request signal from the communication ECU disables the use of a specific one of the devices mounted on the vehicle, whereby effective measures against theft can be taken even when the key of the vehicle is stolen. In this system, the remote ECU is connected to ECUs such as a door lock ECU, an immobilizer ECU, and a smart ECU through a vehicle LAN.

Patent Literature 5 discloses a vehicle antitheft system in which when a theft alarm signal is transmitted from a mobile phone to an antitheft control circuit on the vehicle through an antitheft service center, the antitheft control circuit supplies an engine restart-prohibiting command to an engine control circuit, under the condition that the vehicle speed is "0", and sets the engine to a restarting-disabled state.

CITATION LIST

Patent Literature

Patent Literature 1: WO2016/167350A1
Patent Literature 2: Japanese Patent Application Laid-open No. 2014-146120
Patent Literature 3: Japanese Patent No. 3597772
Patent Literature 4: Japanese Patent No. 4534455
Patent Literature 5: Japanese Patent Application Laid-open No. 2002-59812

SUMMARY

Technical Problem

According to Patent Literature 1, the ECU/VCU is usually directly connected with the operation system, whereas the MCCS, which is a vehicle-mounted device, is inserted between the ECU/VCU and the operation system, so that the MCCS intervenes in information control of the ECU/VCU and controls the operation system. The insertion of the MCCS between the ECU/VCU and the operation system, however, requires a substantial modification to the existing wiring. Moreover, the reliability of the MCCS and its wiring directly affects the control of the operation system. The MCCS and its wiring therefore have more design restrictions. In addition, Patent Literature 1 has not fully considered the safety in a case where a command to disable starting of the engine is received while the vehicle is running or during starting of the engine.

Patent Literature 2 does not consider the safety in a case where a command to disable starting of the engine is received while the vehicle is running or during starting of the engine. The provision of Article 46 of Road Transport Vehicle Act requires that when a starting state of a vehicle is controlled, vehicle remote control should not be performed on a public road and vehicle remote control should be performed in a state in which a vehicle is parked or stopped.

Patent Literature 3 to Patent Literature 5 do not consider the restarting from the vehicle operation-prohibited state. Moreover, Patent Literature 3 and Patent Literature 4 do not discuss the safety of a case where a signal to prohibit operation is received while the vehicle is running or during starting of the engine. In Patent Literature 5, the operation is prohibited under the condition that the vehicle speed is "0".

However, the operation-prohibited state may be entered on the road while the vehicle is running, which may hinder the other traffic.

In view of the problems in Patent Literature 1 to Patent Literature 5, the applicant of the subject application has examined vehicle-mounted devices for the vehicle remote control system and their connection to vehicles as well as a variety of conditions for safely controlling a starting state of a vehicle and found that a starting state of a vehicle can be safely controlled by utilizing data communication modules (hereinafter referred to as "DCM"), which have recently been mounted on more vehicles, and using information acquired by a variety of vehicle-mounted ECUs through a DCM as a communication module. This finding has led to completion of a vehicle remote control system according to embodiments of the present invention.

More specifically, an object of embodiments of the present invention is to provide a vehicle remote control system capable of controlling the starting state of a vehicle, in which a communication module such as a DCM is connected to an ECU on a vehicle through a vehicle-mounted communication network to acquire a variety of vehicle information, and the acquired vehicle information can be used for appropriately controlling a starting state of the vehicle: vehicle remote control is not performed on a public road, and vehicle remote control is performed in a state in which the vehicle is stopped or parked.

Solution to Problem

The object of embodiments of the present invention can be achieved by the following configuration. More specifically, a vehicle remote control system according to a first aspect of the present invention includes:

a communication module configured to communicate with an ECU of a vehicle and acquire vehicle information on the vehicle; and a server configured to compute a starting state control command for switching between a starting-disabled state and a starting-enabled state of the vehicle based on the vehicle information received from the communication module.

The server includes vehicle information acquisition means for acquiring the vehicle information from the communication module, and remote control instruction means for computing the starting state control command using the vehicle information acquired by the vehicle information acquisition means and outputting the starting state control command to the communication module.

A condition for switching between the starting-disabled state and the starting-enabled state of the vehicle by the communication module is that, in addition to that power of the vehicle being off, at least one of condition (a) and condition (b) is satisfied, and the conditions (a) and (b) are as follows:

(a) based on vehicle information from a vehicle-mounted sensor in the vehicle acquired through a vehicle-mounted network, (1) it is determined that the vehicle is stopped, or (2) it is determined that the vehicle is not stopped on a public road, and based on position information from a vehicle-mounted GPS in the vehicle, (3) the vehicle is stopped at a predetermined parking area;

(b) based on the vehicle information from the vehicle-mounted sensor in the vehicle acquired through the vehicle-mounted network, (1) it is determined that the vehicle is stopped, and based on the position information from the vehicle-mounted GPS in the vehicle, (2) it is determined that the vehicle is not stopped on a public road, or (3) it is determined that the vehicle is stopped at a predetermined parking area.

According to a second aspect of the present invention, in the vehicle remote control system of the first aspect, the condition (1) at least includes:

(1-1) a door of the vehicle being locked;
(1-2) the vehicle carrying no passengers;
(1-3) a parking brake of the vehicle being at a parking position;
(1-4) an in-vehicle camera in the vehicle not detecting a person; or
(1-5) a human detection sensor in the vehicle not detecting a person.

According to a third aspect of the present invention, in the vehicle remote control system of the first or second aspect, the condition (2) at least includes:

as the condition (a), (2-1) the vehicle-mounted sensor in the vehicle not detecting a predetermined road lane; or as the condition (b), (2-2) the position information on the vehicle indicating that the vehicle is not stopped on a public road on a map.

According to a fourth aspect of the present invention, in the vehicle remote control system of any one of the first to third aspects, the condition (3) at least includes:

(3-1) position information on the vehicle indicating that the vehicle is stopped at a predetermined parking area on a map; or (3-2) GeoFense indicating that the vehicle is stopped at a predetermined parking area.

According to a fifth aspect of the present invention, in the vehicle remote control system of any one of the first to fourth aspects, at least some of the conditions for switching between the starting-disabled state and the starting-enabled state of the vehicle are determined by the remote control instruction means.

According to a sixth aspect of the present invention, in the vehicle remote control system of any one of the first to fourth aspects, at least some of the conditions for switching between the starting-disabled state and the starting-enabled state of the vehicle are determined by the communication module.

According to a seventh aspect of the present invention, in the vehicle remote control system of any one of the first to sixth aspects, the server is able to communicate with at least one of a manager terminal, a financial system, and a user terminal.

According to an eighth aspect of the present invention, in the vehicle remote control system of any one of the first to seventh aspects, the communication module is further configured to receive the starting state control command through the user terminal or an IC card.

A communication module according to a ninth aspect of the present invention is configured to communicate with an ECU of a vehicle to acquire vehicle information on the vehicle and transmit the vehicle information to a server configured to compute a starting state control command for switching between a starting-disabled state and a starting-enabled state of the vehicle based on the vehicle information.

A condition for switching between the starting-disabled state and the starting-enabled state of the vehicle by the communication module is that, in addition to that power of the vehicle being off, at least one of condition (a) and condition (b) is satisfied, and the conditions (a) and (b) are as follows:

(a) based on vehicle information from a vehicle-mounted sensor in the vehicle acquired through a vehicle-mounted network, (1) it is determined the vehicle is stopped, or (2) it is determined that the vehicle is not stopped on a public road, and based on position information from a vehicle-mounted GPS in the vehicle, (3) the vehicle is stopped at a predetermined parking area;

(b) based on the vehicle information from the vehicle-mounted sensor in the vehicle acquired through the vehicle-mounted network, (1) it is determined that the vehicle is stopped, and based on the position information from the vehicle-mounted GPS in the vehicle, (2) it is determined that the vehicle is not stopped on a public road, or (3) it is determined that the vehicle is stopped at a predetermined parking area.

According to a tenth aspect of the present invention, in the communication module of the ninth aspect, the condition (1) at least includes:

(1-1) a door of the vehicle being locked;
(1-2) the vehicle carrying no passengers;
(1-3) a parking brake of the vehicle being at a parking position;
(1-4) an in-vehicle camera in the vehicle not detecting a person; or
(1-5) a human detection sensor in the vehicle not detecting a person.

According to an eleventh aspect of the present invention, in the communication module of the ninth or tenth aspect, the condition (2) at least includes:

as the condition (a), (2-1) the vehicle-mounted sensor in the vehicle not detecting a predetermined road lane; or
as the condition (b), (2-2) the position information on the vehicle indicating that the vehicle is not stopped on a public road on a map.

According to a twelfth aspect of the present invention, in the communication module of the ninth to eleventh aspects, the condition (3) at least includes:

(3-1) position information on the vehicle indicating that the vehicle is stopped at a predetermined parking area on a map; or
(3-2) GeoFense indicating that the vehicle is stopped at a predetermined parking area.

According to a thirteenth aspect of the present invention, in the communication module of any one of the ninth to twelfth aspects, at least some of the conditions for switching between the starting-disabled state and the starting-enabled state of the vehicle are determined by the server.

According to a fourteenth aspect of the present invention, in the communication module of any one of the ninth to twelfth aspects, at least some of the conditions for switching between the starting-disabled state and the starting-enabled state of the vehicle are determined by the communication module.

According to a fifteenth aspect of the present invention, in the communication module of any one of the ninth to fourteenth aspects, the communication module is further configured to receive the starting state control command through a user terminal or an IC card.

A vehicle according to a sixteenth aspect of the present invention includes the communication module of any one of the ninth to fifteenth aspects.

A server according to a seventeenth aspect of the present invention is configured to compute a starting state control command for switching between a starting-disabled state and a starting-enabled state of a vehicle based on vehicle information on the vehicle received from a communication module. The server includes:

vehicle information acquisition means for acquiring the vehicle information from the communication module; and
remote control instruction means for computing the starting state control command using the vehicle information acquired by the vehicle information acquisition means and outputting the starting state control command to the communication module.

A condition for switching between the starting-disabled state and the starting-enabled state of the vehicle by the communication module is that, in addition to that power of the vehicle being off, at least one of condition (a) and condition (b) is satisfied, and the conditions (a) and (b) are as follows:

(a) based on vehicle information from a vehicle-mounted sensor in the vehicle acquired through a vehicle-mounted network, (1) it is determined that the vehicle is stopped, or (2) it is determined that the vehicle is not stopped on a public road, and based on position information from a vehicle-mounted GPS in the vehicle, (3) the vehicle is stopped at a predetermined parking area;

(b) based on the vehicle information from the vehicle-mounted sensor in the vehicle acquired through the vehicle-mounted network, (1) it is determined that the vehicle is stopped, and based on the position information from the vehicle-mounted GPS in the vehicle, (2) it is determined that the vehicle is not stopped on a public road, or (3) it is determined that the vehicle is stopped at a predetermined parking area.

According to an eighteenth aspect of the present invention, in the server of the seventeenth aspect, the condition (1) at least includes:

(1-1) a door of the vehicle being locked;
(1-2) the vehicle carrying no passengers;
(1-3) a parking brake of the vehicle being at a parking position;
(1-4) an in-vehicle camera in the vehicle not detecting a person; or
(1-5) a human detection sensor in the vehicle not detecting a person.

According to a nineteenth aspect of the present invention, in the server of the seventeenth or eighteenth aspect, the condition (2) at least includes:

as the condition (a), (2-1) the vehicle-mounted sensor in the vehicle not detecting a predetermined road lane; or
as the condition (b), (2-2) the position information on the vehicle indicating that the vehicle is not stopped on a public road on a map.

According to a twentieth aspect of the present invention, in the server of any one of the seventeenth to nineteenth aspects, the condition (3) at least includes:

(3-1) position information on the vehicle indicating that the vehicle is stopped at a predetermined parking area on a map; or
(3-2) GeoFense indicating that the vehicle is stopped at a predetermined parking area.

According to a twenty-first aspect of the present invention, in the server of any one of the seventeenth to twentieth aspects, at least some of the conditions for switching between the starting-disabled state and the starting-enabled state of the vehicle are determined by the remote control instruction means.

According to a twenty-second aspect of the present invention, in the server of any one of the seventeenth to twentieth aspects, at least some of the conditions for switching between the starting-disabled state and the starting-enabled state of the vehicle are determined by the communication module.

According to a twenty-third aspect of the present invention, in the server of any one of the seventeenth to twenty-second aspects, the server is able to communicate with at least one of a manager terminal, a financial system, and a user terminal.

According to a twenty-fourth aspect of the present invention, in the server of any one of the seventeenth to twenty-third aspects, the starting state control command is capable of being input into the communication module through a user terminal or an IC card.

A vehicle remote control method according to a twenty-fifth aspect of the present invention computes a starting state control command for switching between a starting-disabled state and a starting-enabled state of a vehicle based on vehicle information on the vehicle received from a communication module.

The method includes:
vehicle information acquisition means for acquiring the vehicle information from the communication module; and
remote control instruction means for computing the starting state control command using the vehicle information acquired by the vehicle information acquisition means and outputting the starting state control command to the communication module.

A condition for switching between the starting-disabled state and the starting-enabled state of the vehicle by the communication module is that, in addition to that power of the vehicle being off, at least one of condition (a) and condition (b) is satisfied, and the conditions (a) and (b) are as follows:

(a) based on vehicle information from a vehicle-mounted sensor in the vehicle acquired through a vehicle-mounted network, (1) it is determined that the vehicle is stopped, or (2) it is determined that the vehicle is not stopped on a public road, and
based on position information from a vehicle-mounted GPS in the vehicle, (3) the vehicle is stopped at a predetermined parking area;

(b) based on the vehicle information from the vehicle-mounted sensor in the vehicle acquired through the vehicle-mounted network, (1) it is determined that the vehicle is stopped, and
based on the position information from the vehicle-mounted GPS in the vehicle, (2) it is determined that the vehicle is not stopped on a public road, or (3) it is determined that the vehicle is stopped at a predetermined parking area.

According to a twenty-sixth aspect of the present invention, in the vehicle remote control method of the twenty-fifth aspect, the condition (1) at least includes:
(1-1) a door of the vehicle being locked;
(1-2) the vehicle carrying no passengers;
(1-3) a parking brake of the vehicle being at a parking position;
(1-4) an in-vehicle camera in the vehicle not detecting a person; or
(1-5) a human detection sensor in the vehicle not detecting a person.

According to a twenty-seventh aspect of the present invention, in the vehicle remote control method of the twenty-fifth or twenty-sixth aspect, the condition (2) at least includes:
as the condition (a), (2-1) the vehicle-mounted sensor in the vehicle not detecting a predetermined road lane; or
as the condition (b), (2-2) the position information on the vehicle indicating that the vehicle is not stopped on a public road on a map.

According to a twenty-eighth aspect of the present invention, the vehicle remote control method of any one of the twenty-fifth to twenty-seventh aspects, the condition (3) at least includes:
(3-1) position information on the vehicle indicating that the vehicle is stopped at a predetermined parking area on a map; or (3-2) GeoFense indicating that the vehicle is stopped at a predetermined parking area.

According to a twenty-ninth aspect of the present invention, in the vehicle remote control method of any one of the twenty-fifth to twenty-eighth aspects, at least some of the conditions for switching between the starting-disabled state and the starting-enabled state of the vehicle are determined by the remote control instruction means.

According to a thirtieth aspect of the present invention, in the vehicle remote control method of any one of the twenty-fifth to twenty-eighth aspects, at least some of the conditions for switching between the starting-disabled state and the starting-enabled state of the vehicle are determined by the communication module.

According to a thirty-first aspect of the present invention, in the vehicle remote control method of any one of the twenty-fifth to thirtieth aspects, the method further includes means for communicating with at least one of a manager terminal, a financial system, and a user terminal.

According to a thirty-second aspect of the present invention, in the vehicle remote control method of any one of the twenty-fifth to thirty-first aspects, the communication module is further configured to receive a starting state control command through a user terminal or an IC card.

A vehicle remote control program according to a thirty-third aspect of the present invention causes a computer to execute the means in the vehicle remote control method of any one of the twenty-fifth to thirty-second aspects.

A storage medium according to a thirty-fourth aspect of the present invention stores therein the vehicle remote control program of the thirty-third aspect.

Advantageous Effects of Invention

In the vehicle remote control system according to the first aspect, the communication module is connected to the ECU on the vehicle through a vehicle-mounted communication network to acquire a variety of vehicle information, and the acquired vehicle information can be used for appropriately controlling a starting state of the vehicle: vehicle remote control is not performed on a public road, and vehicle remote control is performed in a state in which the vehicle is stopped or parked. Thus, the vehicle remote control system capable of controlling the starting state of the vehicle can be provided. As a specific condition, in addition to that power of the vehicle being off, at least one of condition (a) and condition (b) is satisfied, and the conditions (a) and (b) are as follows:

(a) based on vehicle information from a vehicle-mounted sensor in the vehicle acquired through the vehicle-mounted network, (1) it is determined that the vehicle is stopped, or (2) it is determined that the vehicle is not stopped on a public road, and based on position information from a vehicle-mounted GPS in the vehicle, (3) the vehicle is stopped at a predetermined parking area;

(b) based on the vehicle information from the vehicle-mounted sensor in the vehicle acquired through the vehicle-mounted network, (1) it is determined that the vehicle is stopped, and based on the position information from the vehicle-mounted GPS in the vehicle, (2) it is determined that the vehicle is not stopped on a public road, or (3) it is determined that the vehicle is stopped at a predetermined parking area.

In the vehicle remote control system according to the second aspect, the condition (1) can be set as appropriate.

In the vehicle remote control system according to the third aspect, the condition (2) can be set as appropriate.

In the vehicle remote control system according to the fourth aspect, the condition (3) can be set as appropriate.

In the vehicle remote control system according to the fifth aspect, at least some of the conditions for switching between the starting-disabled state and the starting-enabled state of the vehicle can be determined by the remote control instruction means. The condition for switching between the starting-disabled state and the starting-enabled state of the vehicle is determined in consideration of the vehicle information received from the communication module, in addition to information obtained by the server, so that an appropriate condition determination can be made. The condition determination may be entirely performed on the server side. In this case, the computation load on the communication module side can be reduced. Alternatively, the condition determination may be partially performed on the server side and the remaining condition determination may be performed on the communication module side.

In the vehicle remote control system according to the sixth aspect, at least some of the conditions for switching between the starting-disabled state and the starting-enabled state of the vehicle can be determined by the communication module. The communication module determines the condition for switching between the starting-disabled state and the starting-enabled state of the vehicle in consideration of information obtained from the ECU or the navigation system, so that an appropriate condition determination can be made. The condition determination may be entirely performed on the communication module side. In this case, on the server side, the starting state control command is output to the communication module side in accordance with the payment status, and on the communication module side, the conditions that vehicle remote control is not performed on a public road and that vehicle remote control is performed in a state in which the vehicle is parked or stopped are determined. This configuration can reduce the computation load and the vehicle monitoring load on the server side. Alternatively, the condition determination may be partially performed on the communication module side and the remaining condition determination may be performed on the server side.

In the vehicle remote control system according to the seventh aspect, the server can communicate with at least one of a manager terminal, a financial system, and a user terminal. The manager can monitor and manage the vehicle remote control system appropriately using the manager terminal. The server can communicate, for example, with the financial system to grasp the payment status of the vehicle usage fee by the user of the vehicle, as appropriate. Since the server can communicate with the user terminal, the server can provide the user with notification as to switching between the starting-disabled state and the starting-enabled state of the vehicle, warning about the payment status, and a variety of information about the vehicle.

In the vehicle remote control system according to the eighth aspect, the starting state control command can be input to the communication module through a wireless communication network as well as a user terminal or an IC card, so that locking and unlocking of a door lock and vehicle starting control can be performed with convenient means for the user. This configuration can provide a vehicle remote control system convenient for the user.

The communication module according to the ninth aspect can connect to the ECU on the vehicle through a vehicle-mounted communication network to acquire a variety of vehicle information and can appropriately control a starting state of the vehicle using the acquired vehicle information: vehicle remote control is not performed on a public road, and vehicle remote control is performed in a state in which the vehicle is parked or stopped. Thus, the communication module capable of controlling the starting state of the vehicle can be provided. As a specific condition, in addition to that power of the vehicle being off, at least one of condition (a) and condition (b) is satisfied, and the conditions (a) and (b) are as follows:

(a) based on vehicle information from a vehicle-mounted sensor in the vehicle acquired through the vehicle-mounted network, (1) it is determined that the vehicle is stopped, or (2) it is determined that the vehicle is not stopped on a public road, and based on position information from a vehicle-mounted GPS in the vehicle, (3) the vehicle is stopped at a predetermined parking area;

(b) based on the vehicle information from the vehicle-mounted sensor in the vehicle acquired through the vehicle-mounted network, (1) it is determined that the vehicle is stopped, and based on position information from the vehicle-mounted GPS in the vehicle, (2) it is determined that the vehicle is not stopped on a public road, or (3) it is determined that the vehicle is stopped at a predetermined parking area.

In the communication module according to the tenth aspect, the condition (1) can be set as appropriate.

In the communication module according to the eleventh aspect, the condition (2) can be set as appropriate.

In the communication module according to the twelfth aspect, the condition (3) can be set as appropriate.

In the communication module according to the thirteenth aspect, at least some of the conditions for switching between the starting-disabled state and the starting-enabled state of the vehicle can be determined by the server. The condition for switching between the starting-disabled state and the starting-enabled state of the vehicle is determined in consideration of the vehicle information received from the communication module, in addition to information obtained by the server, so that an appropriate condition determination can be made. The condition determination may be entirely performed on the server side. In this case, the computation load on the communication module side can be reduced. Alternatively, the condition determination may be partially performed on the server side and the remaining condition determination may be performed on the communication module side.

In the communication module according to the fourteenth aspect, at least some of the conditions for switching between the starting-disabled state and the starting-enabled state of the vehicle can be determined by the communication module. The communication module determines the condition for switching between the starting-disabled state and the starting-enabled state of the vehicle in consideration of information obtained from the ECU or the navigation system, so that an appropriate condition determination can be made. The condition determination may be entirely performed on the communication module side. In this case, on the server side, the starting state control command is output to the communication module side in accordance with the payment status, and on the communication module side, the conditions that vehicle remote control is not performed on a public road and that vehicle remote control is performed in a state in which the vehicle is parked or stopped are determined. This configuration can reduce the computation load and the vehicle monitoring load on the server side. Alternatively, the condition determination may be partially performed on the communication module side and the remaining condition determination may be performed on the server side.

In the communication module according to the fifteenth aspect, the starting state control command can be input through a wireless communication network as well as a user terminal or an IC card, so that locking and unlocking of a door lock and vehicle starting control can be performed with convenient means for the user. This configuration can provide a communication module convenient for the user.

The vehicle according to the sixteenth aspect achieves the same effect as the communication module of any one of the ninth to fourteenth aspects.

In the server according to the seventeenth aspect, the communication module is connected to the ECU on the vehicle through a vehicle-mounted communication network to acquire a variety of vehicle information, and the acquired vehicle information can be used for appropriately controlling a starting state of the vehicle: vehicle remote control is not performed on a public road, and vehicle remote control is performed in a state in which the vehicle is parked or stopped. Thus, the server capable of controlling the starting state of the vehicle can be provided. As a specific condition, in addition to that power of the vehicle being off, at least one of condition (a) and condition (b) is satisfied, and the conditions (a) and (b) are as follows:

(a) based on vehicle information from the vehicle-mounted sensor in the vehicle acquired through a vehicle-mounted network, (1) it is determined that the vehicle is stopped, or (2) it is determined that the vehicle is not stopped on a public road, and based on position information from a vehicle-mounted GPS in the vehicle, (3) the vehicle is stopped at a predetermined parking area;

(b) based on the vehicle information from the vehicle-mounted sensor in the vehicle acquired through the vehicle-mounted network, (1) it is determined that the vehicle is stopped, and based on the position information from the vehicle-mounted GPS in the vehicle, (2) it is determined that the vehicle is not stopped on a public road, or (3) it is determined that the vehicle is stopped at a predetermined parking area.

In the server according to the eighteenth aspect, the condition (1) can be set as appropriate.

In the server according to the nineteenth aspect, the condition (2) can be set as appropriate.

In the server according to the twentieth aspect, the condition (3) can be set as appropriate.

In the server according to the twenty-first aspect, at least some of the conditions for switching between the starting-disabled state and the starting-enabled state of the vehicle can be determined by the remote control instruction means. The condition for switching between the starting-disabled state and the starting-enabled state of the vehicle is determined in consideration of the vehicle information received from the communication module, in addition to information obtained by the server, so that an appropriate condition determination can be made. The condition determination may be entirely performed on the server side. In this case, the computation load on the communication module side can be reduced. Alternatively, the condition determination may be partially performed on the server side and the remaining condition determination may be performed on the communication module side.

In the server according to the twenty-second aspect, at least some of the conditions for switching between the starting-disabled state and the starting-enabled state of the vehicle can be determined by the communication module. The communication module determines the condition for switching between the starting-disabled state and the starting-enabled state of the vehicle in consideration of information obtained from the ECU or the navigation system, so that an appropriate condition determination can be made. The condition determination may be entirely performed on the communication module side. In this case, on the server side, the starting state control command is output to the communication module side in accordance with the payment status, and on the communication module side, the conditions that vehicle remote control is not performed on a public road and that vehicle remote control is performed in a state in which the vehicle is parked or stopped are determined. This configuration can reduce the computation load and the vehicle monitoring load on the server side. Alternatively, the condition determination may be partially performed on the communication module side and the remaining condition determination may be performed on the server side.

The server according to the twenty-third aspect can communicate with at least one of a manager terminal, a financial system, and a user terminal. The manager can monitor and manage the vehicle remote control system appropriately using the manager terminal. The server can communicate, for example, with the financial system to grasp the payment status of the vehicle usage fee by the user of the vehicle, as appropriate. Since the server can communicate with the user terminal, the server can provide the user with notification as to switching between the starting-disabled state and the starting-enabled state of the vehicle, warning about the payment status, and a variety of information about the vehicle.

In the server according to the twenty-fourth aspect, the starting state control command can be input to the communication module through a wireless communication network as well as a user terminal or an IC card, so that locking and unlocking of the door lock and vehicle starting control can be performed with convenient means for the user. This configuration can provide a server convenient for the user.

In the vehicle remote control method according to the twenty-fifth aspect, the communication module is connected to the ECU on the vehicle through a vehicle-mounted communication network to acquire a variety of vehicle information, and the acquired vehicle information can be used for appropriately controlling a starting state of the vehicle: vehicle remote control is not performed on a public road, and vehicle remote control is performed in a state in which the vehicle is parked or stopped. Thus, the vehicle remote control method capable of controlling the starting state of the vehicle can be provided. As a specific condition, in addition to that power of the vehicle being off, at least one of condition (a) and condition (b) is satisfied, and the conditions (a) and (b) are as follows:

(a) based on vehicle information from a vehicle-mounted sensor in the vehicle acquired through the vehicle-mounted network, (1) it is determined that the vehicle is stopped, or (2) it is determined that the vehicle is not stopped on a public road, and based on position information from a vehicle-mounted GPS in the vehicle, (3) the vehicle is stopped at a predetermined parking area;

(b) based on the vehicle information from the vehicle-mounted sensor in the vehicle acquired through the vehicle-mounted network, (1) it is determined that the vehicle is stopped, and based on the position information from the vehicle-mounted GPS in the vehicle, (2) it is determined that the vehicle is not stopped on a public road, or (3) it is determined that the vehicle is stopped at a predetermined parking are.

In the vehicle remote control method according to the twenty-sixth aspect, the condition (1) can be set as appropriate.

In the vehicle remote control method according to the twenty-seventh aspect, the condition (2) can be set as appropriate.

In the vehicle remote control method according to the twenty-eighth aspect, the condition (3) can be set as appropriate.

In the vehicle remote control method according to the twenty-ninth aspect, at least some of the conditions for switching between the starting-disabled state and the starting-enabled state of the vehicle can be determined by the remote control instruction means. The condition for switching between the starting-disabled state and the starting-enabled state of the vehicle is determined in consideration of the vehicle information received from the communication module, in addition to information obtained by the server, so that an appropriate condition determination can be made. The condition determination may be entirely performed on the server side. In this case, the computation load on the communication module side can be reduced. Alternatively, the condition determination may be partially performed on the server side and the remaining condition determination may be performed on the communication module side.

In the vehicle remote control method according to the thirtieth aspect, at least some of the conditions for switching between the starting-disabled state and the starting-enabled state of the vehicle can be determined by the communication module. The communication module determines the condition for switching between the starting-disabled state and the starting-enabled state of the vehicle in consideration of information obtained from the ECU or the navigation system, so that an appropriate condition determination can be made. The condition determination may be entirely performed on the communication module side. In this case, on the server side, the starting state control command is output to the communication module side in accordance with the payment status, and on the communication module side, the conditions that vehicle remote control is not performed on a public road and that vehicle remote control is performed in a state in which the vehicle is parked or stopped are determined. This configuration can reduce the computation load and the vehicle monitoring load on the server side. Alternatively, the condition determination may be partially performed on the communication module side and the remaining condition determination may be performed on the server side.

In the vehicle remote control method according to the thirty-first aspect, the server can communicate with at least one of a manager terminal, a financial system, and a user terminal. The manager can monitor and manage the vehicle remote control system appropriately using the manager terminal. The server can communicate, for example, with the financial system to grasp the payment status of the vehicle usage fee by the user of the vehicle, as appropriate. Since the server can communicate with the user terminal, the server can provide the user with notification as to switching between the starting-disabled state and the starting-enabled state of the vehicle, warning about the payment status, and a variety of information about the vehicle.

In the vehicle remote control method according to the thirty-second aspect, the starting state control command can be input to the communication module through a wireless communication network as well as a user terminal or an IC card, so that locking and unlocking of the door lock and vehicle starting control can be performed with convenient means for the user. This configuration can provide a vehicle remote control method convenient for the user.

The vehicle remote control program according to the thirty-third aspect achieves the same effect as the vehicle remote control method of the twenty-fifth to thirty-second aspects.

The storage medium according to the thirty-fourth aspect stores therein the vehicle remote control program of the thirty-third aspect.

DESCRIPTION OF EMBODIMENTS

A vehicle remote control system, a communication module, a vehicle, a server, a vehicle remote control method, a vehicle remote control program, and a storage medium according to embodiments of the present invention will be described below with reference to the drawings. It should be noted that the embodiments below merely illustrate a vehicle remote control system, a communication module, a vehicle, a server, a vehicle remote control method, a vehicle remote control program, and a storage medium for embodying the technical concept of means for solving the problem. The present invention is not intended to be limited to those embodiments and is applicable equally to other embodiments embraced in the claims.

First Embodiment

Figure 1:
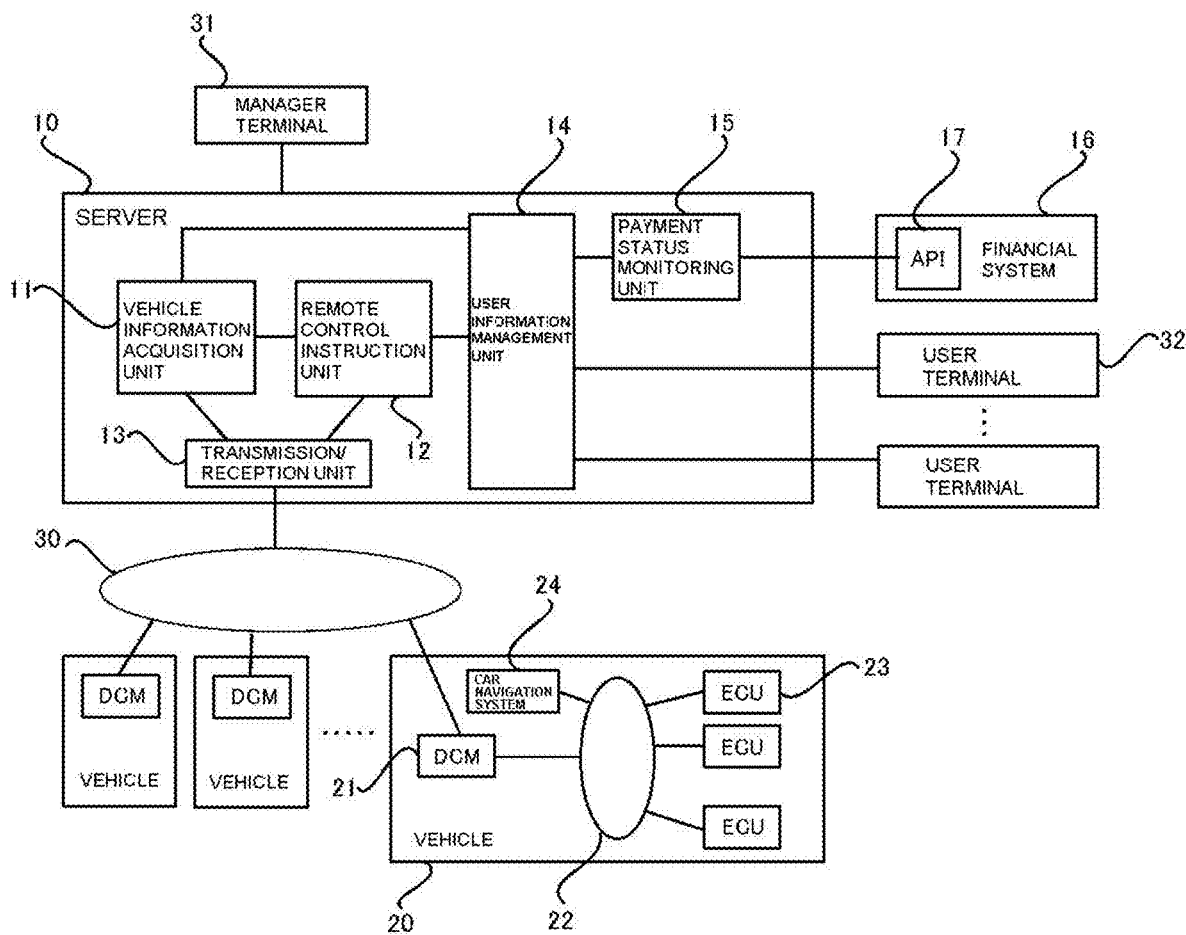
FIG. 1 is a block diagram of a vehicle remote control system in a first embodiment.
Figure 2:
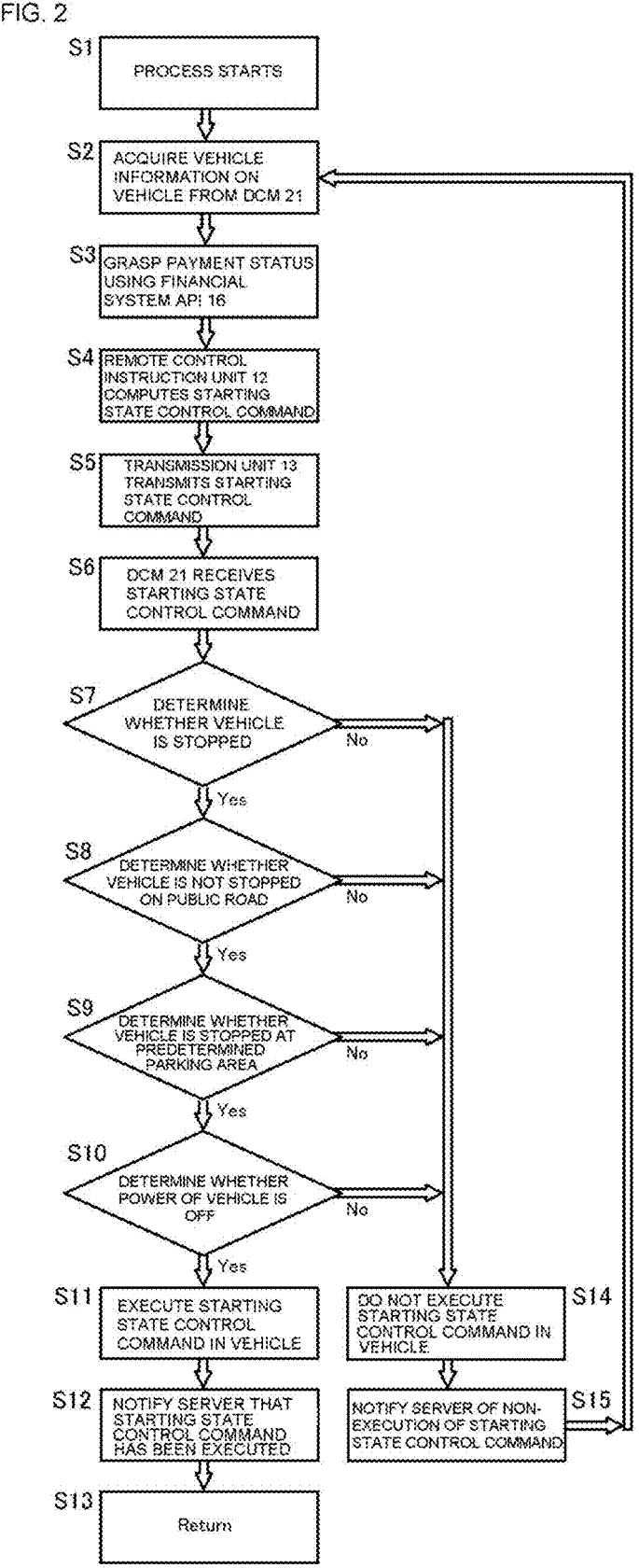
FIG. 2 is a flowchart in the vehicle remote control system in the first embodiment.
Figure 3:
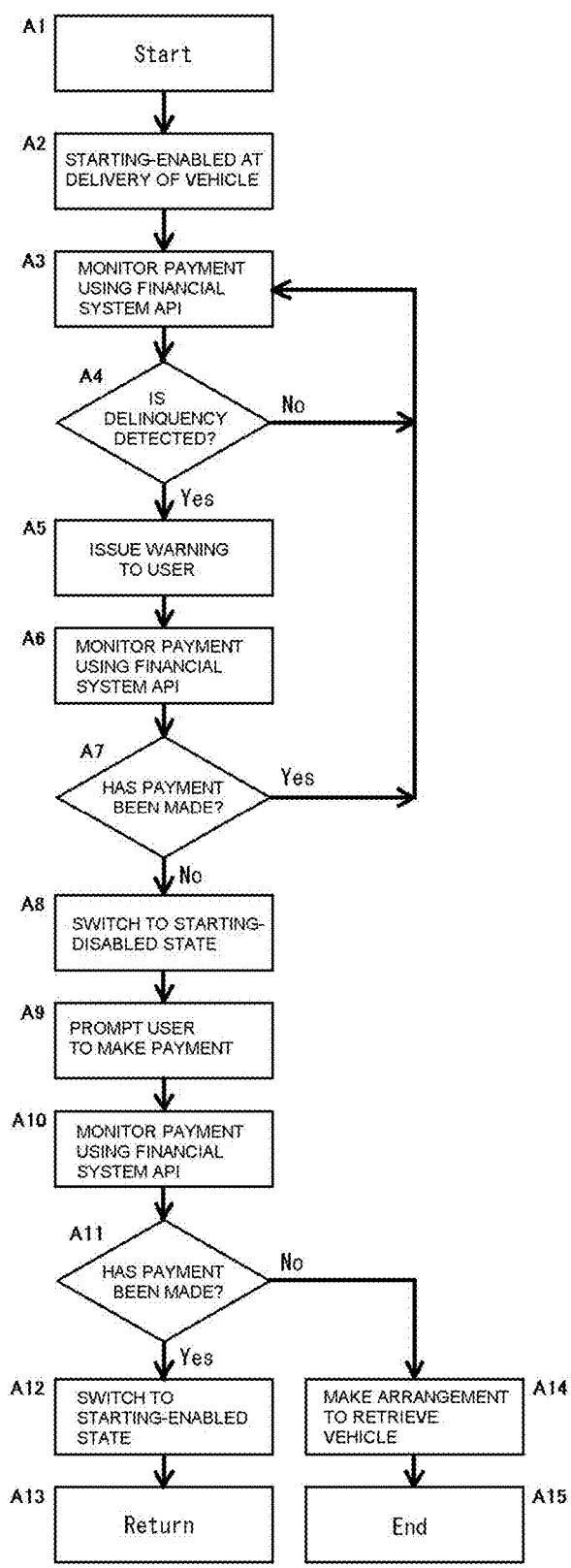
FIG. 3 is a flowchart of monitoring of payment and switching control between a starting-enabled state and a starting-disabled state in a server in the first embodiment.
Figure 4:
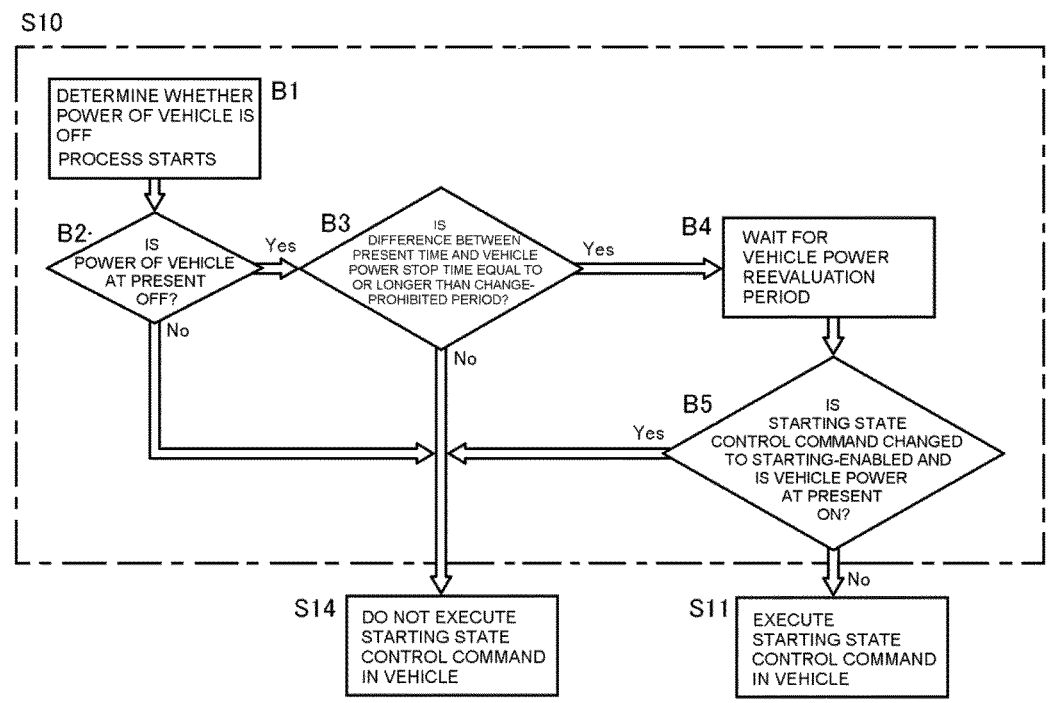
FIG. 4 is a flowchart for determining that the power of a vehicle in the first embodiment is off.

Referring to FIG. 1 to FIG. 4, a vehicle remote control system, a communication module, a vehicle, a server, a vehicle remote control method, a vehicle remote control program, and a storage medium according to a first embodiment will be described. FIG. 1 is a block diagram of the vehicle remote control system in the first embodiment. FIG. 2 is a flowchart in the vehicle remote control system in the first embodiment. FIG. 3 is a flowchart of monitoring of payment and switching control between a starting-enabled state and a starting-disabled state in the server in the first embodiment. FIG. 4 is a flowchart for determining that the power of the vehicle in the first embodiment is off.

As illustrated in FIG. 1, the vehicle remote control system in the first embodiment includes a server 10 and a DCM 21 serving as a communication module provided in a vehicle 20. The vehicle 20 is provided with the DCM 21, a vehicle-mounted local area network (LAN) 22, electronic control units (ECUs) 23, and a car navigation system 24. The server 10 and the DCM 21 on the vehicle 20 are connected to each other via a wireless communication network 30.

One DCM 21 is installed as a genuine product per vehicle 20. Although the DCM 21 has been described as a genuine product, the present invention is not limited thereto and, for example, the DCM 21 as an add-on part may be installed in the vehicle 20. Although the DCM 21 will be described as an example of the communication module, the present invention is not limited thereto, and another communication module capable of communication with the server 10 may be used. Other examples include communication modules for V2X communication (vehicle-to-vehicle communication and vehicle-to-roadside communication) or for communication using other dedicated networks. Here, any wireless communication network can be employed as the wireless communication network 30, and examples include 2G, 3G, 4G, 5G, Wi-Fi (registered trademark), WiMAX (registered trademark), wireless LANs, beacons, Bluetooth (registered trademark), ZigBee (registered trademark), V2X, and other dedicated networks.

The DCM 21 is connected to the ECUs 23 and the car navigation system 24 through the vehicle-mounted LAN 22 and can acquire vehicle information. For example, when the car navigation system 24 is an add-on part to the vehicle 20, for example, the car navigation system 24 may be directly connected to the DCM 21. The DCM 21 transmits vehicle information on the vehicle 20 to the server 10 through the wireless communication network 30, receives a starting state control command from the server 10 through the wireless communication network 30, and sends a control command to the ECU 23 to switch a starting state of the power of the vehicle 20 between a starting-enabled state and a starting-disabled state. In the case of an internal combustion engine car, for example, the DCM 21 sends a control command to the engine ECU 23 in response to a starting state control command to switch the starting state between the starting-disabled state and the starting-enabled state. The engine is unable to be started in the starting-disabled state (this is not to switch off the started engine but to prohibit restarting of the engine), whereas the engine is able to be started in the starting-enabled state.

The vehicle is provided with several tens of ECUs 23, and these ECUs 23 are connected to the DCM 21 through the vehicle-mounted LAN 22. Examples of the ECUs 23 include an engine ECU, an advanced driver assistance system (ADAS) ECU, a door lock ECU, a brake ECU, a steering ECU, an automatic transmission (AT) ECU, an air conditioner ECU, an immobilizer ECU, an illumination ECU, and an airbag ECU. The ECUs include a variety of sensors and can acquire information from, for example, a door open/close and lock, a seating sensor, a human detection sensor (or an infrared sensor), an in-vehicle camera, an exterior camera (camera sensor), a lane detecting sensor, a sensor for autonomous driving or drive assistance, a parking brake sensor, a gear position sensor, a GPS (when the car navigation system 24 is installed, a GPS contained in the car navigation system 24 can be used), GeoFense, a G sensor, a vehicle speed sensor, a tachometer, a steering sensor, a brake sensor, an accelerator sensor, and a variety of operation switch sensors, and transmit such information to the DCM 21 through the vehicle-mounted LAN 22. The DCM 21 grasps the vehicle information and transmits the vehicle information to a vehicle information acquisition unit 11 of the server 10, whereby the server 10 can obtain a variety of vehicle information.

The DCM 21 acquires information on a variety of sensors from the ECUs 23 in real time, or when a particular event occurs, or periodically. The timing when data is transmitted from the DCM 21 to the vehicle information acquisition unit 11 may be real time, when a particular event occurs, periodically, or a combination thereof.

The server 10 includes the vehicle information acquisition unit 11, a remote control instruction unit 12, a transmission/reception unit 13, a user information management unit 14, and a payment status monitoring unit 15. The vehicle information acquisition unit 11 is connected to the DCM 21 of the vehicle 20 through the wireless communication network 30 and the transmission/reception unit 13 and receives the vehicle information on the vehicle 20 acquired by the DCM 21 from, for example, the ECUs 23 and the car navigation system 24. The remote control instruction unit 12 computes a starting state control command using, for example, the vehicle information on the vehicle acquired by the vehicle information acquisition unit 11 and user information on the user information management unit and transmits the starting state control command to the DCM 21 of the vehicle 20 through the transmission/reception unit 13 and the wireless communication network 30. The transmission/reception unit 13 performs wireless communication with a plurality of the DCMs 21 through the wireless communication network 30.

The user information management unit 14 is connected to the vehicle information acquisition unit 11, the payment status monitoring unit, and a user terminal 32 and can access the vehicle information acquired by the vehicle information acquisition unit 11 and grasp a user's payment status monitored by the payment status monitoring unit 15. The user information management unit 14 can communicate with the user terminal 32 to provide the user terminal 32 with information from the user information management unit 14. The user can input, for example, a request to the server 10 using the user terminal 32. Examples of the user terminal include a PC, a mobile phone, and a smartphone.

The payment status monitoring unit 15 is connected to an application programing interface (API) 17 of a financial system 16 to monitor a user's payment status using the API 17 of the financial system 16. "API refers to a protocol that defines procedures and data formats for invoking and using functions of a computer program (software) and data to be managed from a different external computer program (IT glossary e-Words)." When the functions generally used in a different external computer program are provided in the form of a platform such as an OS and middleware, the procedures for invoking and using the functions of the platform are defined by the API. Developers of external programs can use the functions invoked by the API to reduce the burden of developing the functions. The payment status monitoring unit 15 can monitor the payment status of a user through the financial system 16 in real time, using the API 17 of the financial system 16, and thus can promptly detect that the user has made a predetermined payment. The user information management unit 14 can grasp the user's payment status monitored by the payment status monitoring unit 15 in real time.

A manager terminal 31 includes a display for presenting information to the manager and information input means for inputting information from the manager. Examples of the manager terminal 31 include PC, tablet terminal, and portable terminal. A touch panel display, a keyboard, a mouse, and the like can be used as the information input means. When a touch panel display is used, a separate keyboard can be omitted.

In the case of car rental or car sharing, the server 10 may manage reservation of a vehicle and door lock key information. The user information management unit 14 manages reservation of a vehicle through communication with the user terminal 32, transmits door lock key information to the user terminal 32 in accordance with the reservation status and the payment status, and accepts a lock command and an unlock command from the user terminal 32. The remote control instruction unit 12 generates a lock command, an unlock command, and a starting state control command for the DCM 21. Transmitting door lock key information to the user terminal 32 by the user information management unit 14, generating an unlock command for the DCM 21 by the remote control instruction unit 12, and setting the vehicle to the starting-enabled state by a starting state control command correspond to "switching from the starting-disabled state to the starting-enabled state".

The user terminal 32 is preferably, for example, a portable terminal such as a smartphone, a mobile phone, or a tablet terminal and is at least portable in order to be used as a door lock key for a vehicle as in a third embodiment described later. Furthermore, it is preferable that the vehicle 20 and the user terminal 32 have the GPS function. When the vehicle 20 and the user terminal 32 have the GPS function, the server 10 can grasp the position of the vehicle with the GPS installed in the vehicle 20 and grasp the position of the user with the GPS of the user terminal 32 to determine whether a lock command and an unlock command transmitted from the user terminal 32 are valid or invalid. More specifically, when the user terminal 32 is at a distance from the corresponding vehicle 20, the server 10 determines that an unlock command transmitted from the user terminal 32 is invalid and does not transmit an unlock command to the corresponding vehicle 20. On the other hand, when the user terminal 32 is located near the corresponding vehicle 20, the server 10 determines that an unlock command transmitted from the user terminal 32 is valid and transmits an unlock command to the corresponding vehicle 20. Here, the GPS function in the vehicle 20 and the user terminal 32 detects the distance between the vehicle 20 and the user terminal 32. However, it is needless to say that any other configuration may be used to detect the distance between the vehicle 20 and the user terminal 32. For example, when a transmitter/receiver for particular short-range wireless communication is embedded in each of the user terminal 32 and the vehicle 20, the distance between the user terminal 32 and the reserved vehicle 20 can be determined depending on whether the distance is within an area of short-range wireless communication from the user terminal 32 to the vehicle 20. Examples of the short-range wireless communication include Bluetooth (registered trademark), ZigBee (registered trademark), infrared communication, radio frequency identifier (RFID), and near field communication (NFC). The first embodiment of the present invention, however, is not limited thereto and encompasses any kinds of short-range wireless communication.

Even when a vehicle is reserved from a PC at home, a lock command and an unlock command can be transmitted to the corresponding vehicle using a smartphone as long as the smartphone has received door lock key information. In the present embodiment, therefore, the user terminal 32 is not limited to one portable terminal. For example, any of a plurality of portable terminals such as a smartphone and a tablet terminal can transmit a lock command and an unlock command to a specific vehicle 20, and any other various modes may be contemplated.

Although FIG. 1 separately depicts communication via the wireless communication network 30 and communication between the user information management unit 14 and the user terminal 32, the communication between the user information management unit 14 and the user terminal 32 may be via the wireless communication network 30. More specifically, the communication between the user information management unit 14 and the user terminal 32 may be via, for example, 2G, 3G, 4G, 5G, Wi-Fi (registered trademark), WiMAX (registered trademark), a wireless LAN, beacons, Bluetooth (registered trademark), ZigBee (registered trademark), V2X, and any other dedicated networks.

The server 10 can grasp the operation status of the vehicle from vehicle information received from the DCM 21. The server 10 grasps the operation status of the vehicle and thus can grasp, for example, the following:

(1) the vehicle is stopped; specifically,
(1-1) the doors of the vehicle being locked;
(1-2) the vehicle carrying no passengers;
(1-3) the parking brake of the vehicle being at a parking position;
(1-4) an in-vehicle camera in the vehicle not detecting a person; or
(1-5) a human detection sensor in the vehicle not detecting a person.

The server 10 also can grasp, for example, the following:
(2) the vehicle is not stopped on a public road; specifically,
(2-1) a vehicle-mounted sensor in the vehicle not detecting a predetermined lane; or
(2-2) position information on the vehicle indicating that the vehicle is not stopped on a public road on a map.

In addition, the server 10 can grasp, for example, the following:
(3) the vehicle is stopped at a predetermined parking area; specifically
(3-1) position information on the vehicle indicating that the vehicle is stopped at a predetermined parking area on a map; or
(3-2) GeoFense indicating that the vehicle is stopped at a predetermined parking area.

It is needless to say that these operation states can be grasped on the DCM 21 side of the vehicle 20.

The server 10 can further determine whether the vehicle is being parked at a predetermined parking area, whether the vehicle is being parked at a location other than a predetermined parking area, whether the user is moving using the vehicle, or whether there is a possibility that the vehicle is stolen. The determination as to whether each user makes a predetermined payment within a predetermined time limit, the determination as to whether the corresponding vehicle is changed to a starting-disabled state, the determination of the operation state of the vehicle, an inquiry to the user and reporting to the police in the event of theft and abnormality, the determination as to whether the specific vehicle is used without a reservation in advance, whether there is a problem in payment for a reservation, the determination as to whether the specific vehicle is used for a predetermined period or longer beyond the reservation period without an extension procedure in advance, the determination as to whether a geographical range of use of the specific vehicle goes beyond the range set at the time of reservation, the determination as to whether the manner of use of the specific vehicle violates the condition set at the time of booking, the determination as to whether to change the corresponding vehicle to a starting-disabled state, the determination of the operation state of the vehicle, or the determination as to whether to make an inquiry to the user or report to the police in the event of theft or abnormality may be automatically performed by the server 10 or some or all of these determinations may be performed manually by the manager as necessary. The automation by the server 10 can alleviate the burden on the manager. These determinations may be performed automatically by the server 10 or some or all of these determinations may be performed manually by the manager. When the processing is performed automatically by the server 10, manpower can be reduced and the burden on the manager can be alleviated. When some or all of these determinations are performed manually by the manager, the server 10 need not make a complicated condition determination, and the configuration of the server 10 can be simplified. In any case, it is desirable to make a prompt action 24 hours a day 365 days a year.

A method of determining the operation status of the vehicle automatically by the server 10 will now be described in detail. First of all, the determination of (1) the vehicle is stopped, is described.

"(1-1) The doors of the vehicle being locked" can be grasped from information from a door lock sensor.

"(1-2) The vehicle carrying no passengers" can be grasped from information from a seating sensor, a human detection sensor, an infrared sensor, and the like.

"(1-3) The parking brake of the vehicle being at a parking position" can be grasped from information from a gear position sensor.

"(1-4) An in-vehicle camera in the vehicle not detecting a person" can be grasped from information from an in-vehicle camera.

"(1-5) A human detection sensor in the vehicle not detecting a person" can be grasped from a human detection sensor or an infrared sensor.

Next, the determination of (2) the vehicle is not stopped on a public road, is described.

"(2-1) A vehicle-mounted sensor in the vehicle not detecting a predetermined lane" can be grasped from a lane detection sensor, a sensor for autonomous driving or drive assistance, a lane sensor, and the like.

"(2-2) Position information on the vehicle indicating that the vehicle is not stopped on a public road on a map" can be grasped from information from the GPS.

Next, the determination of (3) the vehicle is stopped at a predetermined parking area, is described.

"(3-1) Position information on the vehicle indicating that the vehicle is stopped at a predetermined parking area on a map" can be grasped from the GPS of the car navigation system 24 and map information.

"(3-2) GeoFense indicating that the vehicle is stopped at a predetermined parking area" can be grasped from information from GeoFense.

In addition, when the power of the vehicle is in the off state for a predetermined time or longer at a place equivalent to a parking area registered in advance, it is determined that the vehicle is parked at a predetermined parking area. When the power of the vehicle is in the off state for a predetermined time or longer at a place other than the parking area registered in advance, it is determined that the vehicle is parked at a place other than the predetermined parking area. When the vehicle is at a place other than the parking area registered in advance and the power of the vehicle is not in the off state for a predetermined time or longer, it is determined that the user is moving using the vehicle.

In the case of car sharing or car rental, the parking areas for users to pick up and return vehicles are registered in advance from among a plurality of offices (for example, manned or unmanned parking areas). In the case of car lease, the users register parking areas that they mainly use, in advance. When the power of the vehicle is in the off state at a place corresponding to the parking area registered in advance for a predetermined time or longer, it is determined that the vehicle is being parked at a predetermined parking area. When the power of the vehicle is in the off state at a place other than the parking area registered in advance for a predetermined time or longer, it is determined that the vehicle is being parked at a place other than a predetermined parking area. When the vehicle is at a place other than the parking area registered in advance and the power of the vehicle is not in the off state for a predetermined time or longer, it is determined that the user is being moved using the vehicle.

When the vehicle is out of the range registered in advance by the user for a predetermined period or longer, it is determined that there is a possibility that the vehicle has been stolen. If it is determined that there is a possibility that the vehicle has been stolen, the contact registered in advance by the user is notified of the vehicle operation status, and an inquiry is made as to whether a theft has occurred. If there is no reply from the user within a predetermined time limit or if there is a reply indicating theft from the user, a notification of theft is given to the manager, and a relay control command corresponding to the starting-disabled state is transmitted to the DCM 21. If the manager receives a notification of theft from the server 10, the manager makes contact with the user to check on the occurrence of theft and then reports the vehicle theft to the police if necessary.

The DCM 21 may be further provided with means for detecting abnormality, specifically, removal of the DCM 21 from the vehicle 20 or disconnection or removal of wiring connected to the DCM 21. Upon detection of such abnormality, the DCM 21 notifies the server 10 of the occurrence of abnormality. Upon this notification, the server 10 promptly notifies the manager. When being notified of the abnormality from the server 10, the manager contacts the user to check the situation in which theft occurs and, if necessary, reports to the police for theft of the vehicle.

The DCM 21 is removed from the vehicle 20, for example, possibly in the following cases: (a) theft by a thief, (b) misuse of the vehicle by the user, and (c) use of the vehicle in an unavoidable emergency situation by the user who fails to pay. In the cases of theft and misuse as in (a) and (b), it is preferable that the vehicle is set to the starting-disabled state. In the emergency case as in (c), for example, when an emergency patient is to be transported, it is preferable that the vehicle is set to the starting-enabled state. When the DCM 21 detects abnormality, the vehicle 20 is set to the starting-disabled state if the manager assumes that the case is theft or misuse as in (a) and (b), whereas the vehicle 20 is set to a starting-enabled state if the manager assumes that the case is emergency as in (c).

The starting state control of the vehicle 20 depending on whether the user makes a payment in the case of car leasing will be described with reference to the flowchart in FIG. 2. The process starts at S1 and proceeds to S2. At the shipment of the vehicle, the starting of the vehicle 20 is enabled, that is, the vehicle 20 is set to the starting-enabled state. At S2, vehicle information on the vehicle is acquired from the DCM 21, and the process proceeds to S3. At S3, the payment status monitoring unit grasps the payment status using the API 17 of the financial system 16, and the process proceeds to S4. At S4, the remote control instruction unit 12 computes a starting state control command in accordance with the flowchart in FIG. 3 described later. The process then proceeds to S5. At S5, the transmission/reception unit 13 transmits the starting state control command to the DCM 21. The process then proceeds to S6.

At S6, the DCM 21 receives the starting state control command. The process then proceeds to S7. At S7, in the DCM 21, it is determined whether the vehicle 20 is being stopped. If Yes, the process proceeds to S8. If No, the process proceeds to S14. The determination at S7 is the determination of (1) previously mentioned, specifically, the determination of, for example, (1-1) to (1-5). At S8, in the DCM 21, it is determined whether the vehicle 20 is not stopped at a public road. If Yes, the process proceeds to S9. If No, the process proceeds to S14. The determination at S8 is the determination of (2) previously mentioned, specifically, the determination of, for example, (2-1) to (2-2). At S9, in the DCM 21, it is determined whether the vehicle 20 is stopped at a predetermined parking area. If Yes, the process proceeds to S10. If No, the process proceeds to S14. The determination at S9 is the determination of (3) previously mentioned, specifically, the determination of, for example, (3-1) to (3-2). At S10, in the DCM 21, it is determined whether the power of the vehicle 20 is off in accordance with the flowchart in FIG. 4 described later. If Yes, the process proceeds to S11. If No, the process proceeds to S14.

At S11, the starting state control command is executed, and the process then proceeds to S12. An example in which the starting state control command is a control command for engine restart is described. When the starting state control command is to "switch to the starting-disabled state", the DCM 21 sends a control command to disable engine starting to the engine ECU 23, so that the engine of the vehicle 20 is set to the starting-disabled state. When the starting state control command is to "switch to the starting-enabled state", the DCM 21 sends a control command to enable engine starting to the engine ECU 23, so that the engine of the vehicle 20 is set to the starting-enabled state. Different kinds of starting state control commands may be provided other than the one for engine restart, for example, the one acting on the immobilizer to control the starting state of the vehicle 20 and the one acting on the door lock to control the starting state of the vehicle 20 as described later.

At S12, the server 10 is notified that the starting state control command has been executed. The process then proceeds to S13. At S13, the process returns to the initial processing (S1). At S14, the starting state control command is not executed in the vehicle 20. At the next S15, the server 10 is notified of non-execution of the starting state control command (that the starting state control command has not been executed). The process then returns to S2.

Next, the routine at S3 and S4 in the flowchart in FIG. 2 is described in detail with reference to the flowchart in FIG. 3. FIG. 3 illustrates an example of the flow of monitoring of payment and switching control between the starting-enabled state and the starting-disabled state in the server 10 in the case of car leasing. At A1, the flow starts. At A2, at the delivery (shipment) of the vehicle, the vehicle is set such that starting is enabled. At A3, the payment status monitoring unit 15 monitors the payment status of the user in real time using the API 17 of the financial system 16. At A4, it is determined whether the user of each vehicle has paid the usage fee within a predetermined time limit (whether there is a delinquency). When the usage fee is not paid within a predetermined time limit (Yes at A4), the process proceeds to A5. At A5, the user is warned that the vehicle will be switched to the starting-disabled state due to the unpaid charge, unless the charge is paid within a predetermined time limit. The process then proceeds to A6. If No at A4, the process returns to A3.

At A6, the payment status monitoring unit 15 monitors the payment status of the user in real time using the API 17 of the financial system 16. At A7, it is determined whether the user of each vehicle has paid the usage fee within a predetermined time limit. If No in the determination at A7, the process proceeds to A8. At A8, the server 10 checks the operation status of the vehicle and, if a predetermined condition is satisfied, transmits a starting state control command corresponding to the starting-disabled state from the remote control instruction unit 12 to the DCM 21 in order to set the corresponding vehicle 20 to the starting-disabled state. The process then proceeds to A9. When the DCM 21 receives the starting state control command corresponding to the starting-disabled state, the corresponding vehicle 20 enters the starting-disabled state, that is, starting of the engine is disabled in the case of an internal combustion engine vehicle. In the present embodiment, if Yes at A4 (if a delinquency is detected), at A5, the user is once warned that the vehicle 20 will be switched to the starting-disabled state. However, the present invention is not limited thereto. For example, if Yes at A4, the process may proceed directly to A8 to switch the vehicle to the starting-disabled state. In this way, when a delinquency is detected, whether the process proceeds directly to A8 to switch the vehicle to the starting-disabled state or a warning is once issued to give a grace period before the vehicle is switched to the starting-disabled state is determined in consideration of, for example, the ordinance in the region of interest and business custom.

On the other hand, if Yes in the determination at A7, the process returns to A3, and the payment status monitoring unit 15 monitors the payment status of the user in real time using the API 17 of the financial system 16. In the absence of a starting state control command corresponding to the starting-disabled state from the server 10 to the DCM 21, the vehicle is usually set to the starting-enabled state. When the usage fee is paid within a predetermined time limit (if Yes at A7), the server 10 does not transmit a starting state control command corresponding to the starting-disabled state to the DCM 21, so that the vehicle 20 is in the starting-enabled state. Specifically, in the case of an internal combustion engine vehicle, starting of the engine is enabled.

At A9, the user is notified that the vehicle is in the starting-disabled state due to the unpaid usage fee and is prompted to pay a predetermined fee by a specified dead line. The process then proceeds to A10. At A10, the payment status monitoring unit 15 monitors the payment status of the user in real time using the API 17 of the financial system 16. At A11, it is determined whether the user of each vehicle has paid the usage fee within a predetermined time limit. If Yes in the determination at A11 (if the fee has been paid), the server 10 transmits a starting state control command corresponding to the starting-enabled state from the remote control instruction unit 12 to the DCM 21 in order to set the corresponding vehicle to the starting-enabled state again. When the DCM 21 receives the starting state control command corresponding to the starting-enabled state, the corresponding vehicle enters the starting-enabled state again.

When the charge is a monthly fee, it is determined whether a predetermined amount of money has been paid, for example, no later than 25th of the previous month (corresponding to A4). If the predetermined amount has not been paid, a message is transmitted to the user to indicate that the user is delinquent and if the predetermined charge fails to be paid within one week, the vehicle will be set to the starting-disabled state (corresponding to A5). If the predetermined charge is not paid within one week from transmission of this message, the server 10 checks the vehicle operation status and then transmits a starting state control command corresponding to the starting-disabled state from the remote control instruction unit 12 to the corresponding DCM 21 under the condition that a predetermined condition is satisfied (corresponding to A8). If the user does not pay a predetermined fee after the elapse of a predetermined period of time, for example, one month since the vehicle was set to the starting disabled state (if No in the determination at A11), the manager makes an arrangement to retrieve the vehicle, using the position information on the vehicle acquired by the vehicle information acquisition unit 11 (corresponding to A14. Subsequently, the process ends at A15).

On the other hand, if the deposit of the predetermined amount of money by the user is confirmed within the predetermined time limit after the starting state control command corresponding to the starting-disabled state is transmitted to the DCM 21 (if yes in the determination at A11), the server 10 transmits a starting state control command corresponding to the starting-enabled state from the remote control instruction unit 12 to the corresponding DCM 21 and sets the vehicle to the starting-enabled state again (corresponding to A12). In the absence of a starting state control command corresponding to the starting-disabled state from the server 10 to the DCM 21, the vehicle 20 is usually set to the starting-enabled state. Accordingly, the user can use the vehicle kept in the starting-enabled state as long as the user has paid a predetermined fee no later than 25th every month.

If the user wishes to immediately use the vehicle after the vehicle is switched to the starting-disabled state at A8 and the user is prompted to make the predetermined payment at A9, the user promptly makes the payment. In this case, as the user wishes to use the vehicle immediately, a time lag between the predetermined payment and the switching of the vehicle from the starting-disabled state to the starting-enabled state is unfavorable for the user who wants to use the vehicle immediately. Then, the payment status of the user is monitored in real time using the API 17 of the financial system 16 at A10, so that the predetermined payment by the user can be grasped in real time at A11, and immediately after the predetermined payment, the server 10 transmits a starting state control command corresponding to the starting-enabled state from the remote control instruction unit 12 to the corresponding DCM 21 and sets the vehicle 20 to the starting-enabled state again, at A12. The process returns at A13.

The present invention is not limited to car leasing and is applicable to, for example, car sharing and car rental and also applicable to, for example, control of locking and unlocking the door lock key and switching control between the starting-enabled state and the starting-disabled state by the engine starting relay control command. For example, in the case of car sharing or car rental, after the user finishes settlement to pay for the usage fee through internet banking, card transaction, etc. when reserving a vehicle for the user information management unit 14 of the server 10 using the user terminal 32, the user information management unit 14 transmits door lock key information to the user terminal 32. The user can control locking and unlocking of the door lock of the vehicle through the server 10 using the door lock key information. The server 10 also can perform control of switching the vehicle 20 between the starting-enabled state and the starting-disabled state in accordance with the user's payment status and the status of the vehicle. Also in this case, the payment status of the user is monitored in real time using the API 17 of the financial system 16 to grasp a predetermined payment made by the user in real time. This configuration can reduce a time lag between the payment of the predetermined charge by the user and removal of restriction on starting of the vehicle (for example, unlocking of the door lock or switching of the vehicle 20 to the starting-enabled state).

Next, the routine at S10 in the flowchart in FIG. 2 is described in detail with reference to the flowchart in FIG. 4. FIG. 4 is the flowchart for determining whether the power of the vehicle 20 is off. At B1, the determination as to whether the power of the vehicle 20 is off is started. The process then proceeds to B2. At B2, it is determined whether the power of the vehicle at present is off. If Yes in the determination at B2, the process proceeds to B3. If No in the determination at B2, the process proceeds to S14. At B3, it is determined whether the difference between the present time and the vehicle power stop time is equal to or longer than a change-prohibited period (X minutes). If Yes in the determination at B3, the process proceeds to B4. If No, the process proceeds to S14.

At B4, the process waits for a vehicle power reevaluation period (Y seconds). Subsequently, the process proceeds to B5. At B5, it is determined whether the starting state control command is to change to the starting-disabled state and the vehicle power at present is on. If Yes in the determination at B5, the process proceeds to S14. If No, the process proceeds to S11.

At B3, if the engine is turned on for past X minutes (for example, two minutes) when the DCM 21 receives a starting state control command from the server 10, the starting state control command is ignored. When the starting state control command is to switch to the starting-disabled state and the vehicle power at present is on, for example, if turning-on of the engine is detected for Y seconds (for example, five seconds) after the starting state control command is received, the vehicle 20 is set to the starting-enabled state.

Here, the ground for setting the X minutes to, for example, two minutes will be described. The DCM 21 is switched to the power saving mode 10 minutes or so after engine stop to suppress power consumption. In the state of the power saving mode, when the user gets into the vehicle, inserts the key into the cylinder to start the engine, and turns the ignition into the on state, the DCM 21 is switched to the normal mode by interrupt control. It takes about 1 minute when the radio wave condition is good, and takes about 1 minute and 30 seconds when the communication has to be retried 5 times or so because of a poor radio wave condition, until the server 10 recognizes that the DCM 21 has been switched to the normal mode. A starting state control command to switch to the starting-disabled state is not employed (ignored) for a certain period after the power of the vehicle is turned off, thereby preventing the vehicle 20 from improperly switching to the starting-disabled state when the power of the vehicle is turned on again immediately after the power of the vehicle 20 is turned off. For example, it is possible to prevent the vehicle from improperly switching to the starting-disabled state in a case where while baggage is unloaded from the trunk or seat in a parking area, the vehicle is temporarily stopped at a position slightly displaced from the parking space, with the power of the vehicle turned off, and after unloading of baggage, the vehicle is pulled into the parking space with the power of the vehicle turned on again. Conversely, when the X minutes is too long, the vehicle 20 is unable to be switched to the starting-disabled state in some cases. In this situation, a relay control command is ignored when the engine is on for the past two minutes.

The ground for setting the Y seconds to, for example, five seconds will now be described. When a starting state control command is received while the power of the vehicle is on, the DCM 21 does not accept the starting state control command (ignores the starting state control command), in consideration of safety. While the power of the vehicle 20 is on, the user is moving on the vehicle 20. Thus, improper switching of the vehicle 20 to the starting-disabled state is prevented, for example, when reception of a starting state control command to change the vehicle 20 to the starting-disabled state is delayed due to a poor radio wave condition. On the other hand, it takes about three seconds for the DCM 21 to recognize the starting of the vehicle 20 after the vehicle 20 is actually started. If the DCM 21 receives a starting state control command immediately after the vehicle 20 is started, the DCM 21 determines that the vehicle 20 is not started and then employs the starting state control command, so that the vehicle is switched to the starting-disabled state although the vehicle is started. In such a situation, when the ignition switch is a push button switch, the starting-disabled state is set by invalidating the push button or by activating the immobilizer (cutting the line for authentication). In the case of invalidating the push button, if switching to the starting-disabled state occurs in the three seconds, the engine may fail to be turned off. On the other hand, in the case of activating the immobilizer, if switching to the starting-disabled state occurs in the three seconds, the push button works to turn off the engine but the gear lever may fail to move into Drive D. Based on the foregoing, three seconds plus a margin, five seconds is employed as the Y seconds.

Preferably, the DCM 21 can perform fail-safe operation independently even in a poor radio wave condition and without a relay control command from the server 10. For example, this configuration can avoid a situation in which the vehicle enters the starting-disabled state at a location with a poor radio wave condition and becomes unable to receive a starting state control command corresponding to starting-enabling information. The DCM 21 repeatedly retries communication to establish communication when the radio wave condition is poor. When communication fails to be established a predetermined number of times, for example, 20 or more retries in succession, it is determined that the communication has failed, and when the state of the starting state control command is the starting-disabled state, switching to the starting-enabled state is performed. This configuration can avoid a situation in which the vehicle 20 is left in the starting-disabled state because the server 10 is unable to transmit a starting state control command to change to the starting-enabled state in a poor radio wave condition. Whether to employ the process of switching the vehicle 20 to the starting-enabled state at the time of communication failure can be set, for example, at the shipment of the vehicle 20, or the setting may be changed by the server 10.

The power saving mode may be set in the DCM 21. When the engine of an internal combustion engine vehicle is off, the DCM 21 shifts to a power saving mode to stop the functions except the minimum required functions such as power supply management in order to prevent consumption of power of the external battery after the elapse of a predetermined time, for example, 10 minutes since turning off of the engine. In the power saving mode, the DCM 21 does not communicate with the server 10. In the power saving mode, if loss of power supply input is detected, if the on state of the engine (ACC on or IG on) is detected, or if the timer circuit counts a predetermined time (for example, every hour), the corresponding circuit that is always active even in the power saving mode performs an interruption control to switch the DCM 21 from the power saving mode to the normal mode.

In the normal mode, the DCM 21 acquires vehicle information from the ECU 23 and the car navigation system 24 in real time or at predetermined time intervals, for example, every 30 seconds, or when a particular event such as turning on of the vehicle power occurs, or at a timing in combination thereof, and transmits the acquired vehicle information to the server 10. When the DCM 21 is switched from the power saving mode to the normal mode by interruption control by the corresponding circuit that is always active, the DCM 21 originates communication with the server 10 to receive a starting state control command and transmit vehicle information. In the normal mode, in addition to communication originating from the DCM 21, communication originating from the server 10 is possible, so that the DCM 21 can receive information such as a starting state control command. When a radio wave condition is poor, communication may be retried multiple times, for example, about five times until communication is established. Even when the radio wave condition is poor and communication fails to be established, the DCM 21 can operate independently in an environment in which it is unable to communicate with the server 10, because the DCM 21 stores a starting state control command received from the server 10 in the latest communication in the memory. Furthermore, because the acquired vehicle information is stored in the memory, the DCM 21 can transmit the acquired information altogether to the server 10 when the communication line is recovered. When the radio wave condition is poor, a starting state control command corresponding to the starting-disabled state may be prevented from being transmitted or received. This configuration can avoid the inconvenience of being unable to change from the starting-disabled state to the starting-enabled state because of a poor radio wave condition.

Second Embodiment

Figure 5:
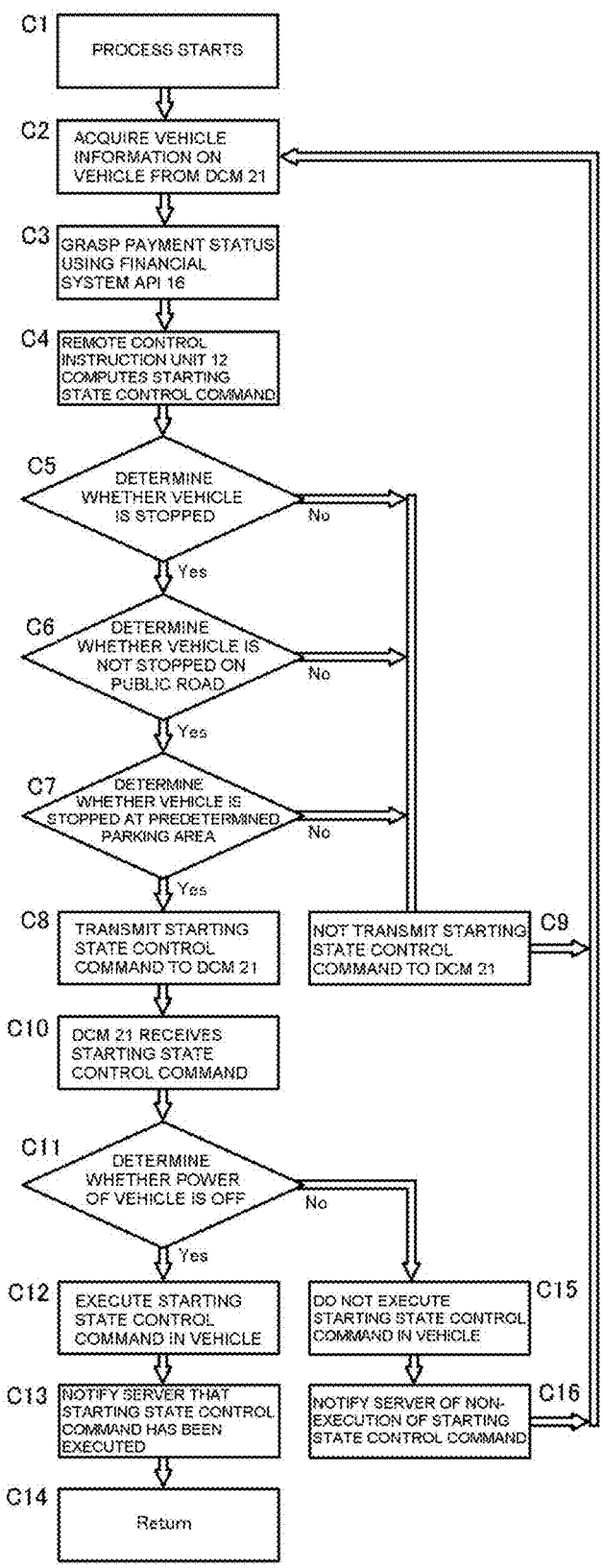
FIG. 5 is a flowchart in a vehicle remote control system in a second embodiment.

Referring to FIG. 5, a vehicle remote control system, a communication module, a vehicle, a server, a vehicle remote control method, a vehicle remote control program, and a storage medium according to a second embodiment will be described. FIG. 5 is a flowchart in the vehicle remote control system in the second embodiment. In the first embodiment, the determinations at S7 to S9 in the flowchart in FIG. 2 are performed on the DCM 21 side. However, in the second embodiment, these determinations are performed on the server 10 side.

The starting state control of the vehicle 20 according to the second embodiment depending on whether the user makes a payment in the case of car leasing will be described with reference to the flowchart in FIG. 5. The process starts at C1 and proceeds to C2. At the shipment of the vehicle, the starting of the vehicle 20 is enabled, that is, the vehicle 20 is set to the starting-enabled state. At C2, vehicle information on the vehicle is acquired from the DCM 21, and the process proceeds to C3. At C3, the payment status monitoring unit grasps the payment status using the API 17 of the financial system 16, and the process proceeds to C4. At C3 and C4, the remote control instruction unit 12 computes a starting state control command in accordance with the flowchart in FIG. 3 described above. The process then proceeds to C5. At C5, the server 10 determines whether the vehicle 20 is being stopped. If Yes, the process proceeds to C6. If No, the process proceeds to C9. The determination at C5 is the determination of (1) previously mentioned, specifically, the determination of, for example, (1-1) to (1-5). At C6, the server 10 determines whether the vehicle 20 is not stopped on a public road. If Yes, the process proceeds to C7. If No, the process proceeds to C9. The determination at C6 is the determination of (2) previously mentioned, specifically, the determination of, for example, (2-1) to (2-2). At C7, the server 10 determines whether the vehicle 20 is stopped at a predetermined parking area. If Yes, the process proceeds to C8. If No, the process proceeds to C9. The determination at C7 is the determination of (3) previously mentioned, specifically, the determination of, for example, (3-1) to (3-2). At C8, the starting state control command is transmitted from the remote control instruction unit 12 to the DCM 21. The process then proceeds to C10. At C9, the starting state control command is not transmitted from the remote control instruction unit 12 to the DCM 21. The process then returns to C2.

At C10, the DCM 21 receives the starting state control command. The process then proceeds to C11. At C11, in the DCM 21, it is determined whether the power of the vehicle 20 is off in accordance with the flowchart in FIG. 4 described above. If Yes, the process proceeds to C12. If No, the process proceeds to C15. At C12, the starting state control command is executed in the vehicle 20. An example in which the starting state control command is a control command for engine restart is described. When the starting state control command is to "switch to the starting-disabled state", the DCM 21 sends a control command to disable engine starting to the engine ECU 23, so that the engine of the vehicle 20 is set to the starting-disabled state. When the starting state control command is to "switch to the starting-enabled state", the DCM 21 sends a control command to enable engine starting to the engine ECU 23, so that the engine of the vehicle 20 is set to the starting-enabled state. Different kinds of starting state control commands may be provided other than the one for engine restart, for example, the one acting on the immobilizer to control the starting state of the vehicle 20 and the one acting on the door lock to control the starting state of the vehicle 20 as described later. After C12, the process proceeds to C13.

At C13, the server 10 is notified that the starting state control command has been executed. The process then proceeds to C14. At C14, the process returns to the initial processing (C1). At C15, the starting state control command is not executed in the vehicle 20. At the next C16, the server 10 is notified of non-execution of the starting state control command (that the starting state control command has not been executed). The process then returns to C2.

The determination as to whether:
(1) the vehicle is stopped,
(2) the vehicle is not stopped on a public road, or
(3) the vehicle is stopped at a predetermined parking area
is performed on the DCM 21 side in the first embodiment and performed on the server 10 side in the second embodiment. However, the embodiments of the present invention are not limited thereto. Some the determinations of (1) to (3) above may be performed on the DCM 21 side and the remaining ones may be performed on the server 10 side. When a communication environment is good, the process in the flowchart in FIG. 4 may be performed on the server 10 side.

The second embodiment is not limited to car leasing and is applicable to, for example, car sharing and car rental and applicable to, for example, control of locking and unlocking the door lock key and switching control between the starting-enabled state and the starting-disabled state by the engine starting relay control command, as described in the first embodiment.

Third Embodiment

Figure 6:
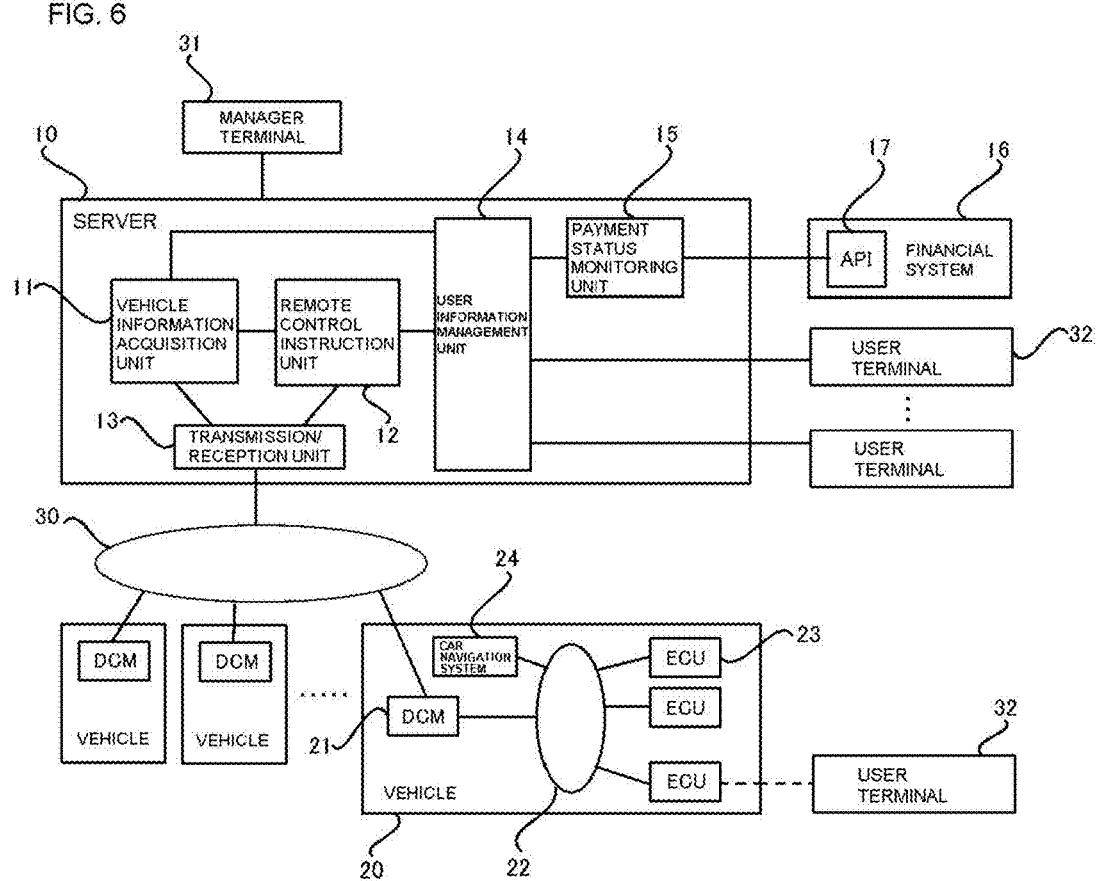
FIG. 6 is a block diagram of a vehicle remote control system in a third embodiment.

Referring to FIG. 6, a vehicle remote control system, a communication module, a vehicle, a server, a vehicle remote control method, a vehicle remote control program, and a storage medium according to a third embodiment of the present invention will be described. FIG. 6 is an overview of the vehicle starting control system according to the third embodiment. The same configuration as in FIG. 1 to FIG. 5 is denoted by the same reference sign and a description thereof is omitted. In the first and second embodiments, a starting state control command is transmitted from the server 10 to the DCM 21 through communication from the server 10 to the DCM 21. The third embodiment differs from the first and second embodiments in that a starting state control command is provided from the server 10 to the DCM 21 through the user terminal 32.

Control of switching to the starting-enabled state again after switching to the starting disabled state once at A12 in the flowchart in FIG. 3 will be described. At A9, the user is notified that the vehicle is in the starting-disabled state due to the unpaid usage fee and is prompted to pay the predetermined fee by the specified dead line. The process then proceeds to A10. At A10, the payment status monitoring unit 15 monitors the payment status of the user in real time using the API 17 of the financial system 16. At A11, it is determined whether the user of each vehicle has paid the usage fee within the predetermined time limit.

If Yes in the determination at A11 (if the fee has been paid), the process proceeds to A12, and an engine starting relay control command for setting the starting-enabled state again is provided from the server 10 to the DCM 21. In doing so, in the present embodiment, a starting state control command for setting the starting-enabled state again is provided from the server 10 to the DCM 21 through the user terminal 32. Specifically, the payment status monitoring unit 15 monitors the payment status of the user in real time using the API 17 of the financial system 16. When it is detected that the user has paid the usage fee within the predetermined time limit, a starting state control command for switching the vehicle to the starting state is transmitted from the user information management unit 14 of the server 10 to the user terminal 32 of the corresponding user.

A transmitter/receiver for particular short-range wireless communication is embedded in each of the user terminal 32 and the vehicle 20 (for example, the door lock ECU 23 of the vehicle 20). Examples of the short-range wireless communication include Bluetooth (registered trademark), ZigBee (registered trademark), infrared communication, radio frequency identifier (RFID), and near field communication (NFC). The present invention, however, is not limited thereto and is intended to include short-range wireless communication of any kinds. For example, when NFC is used, for example, the standards such as Type A (low-end type), Type B (the type employed by ETC in Europe), and Type F (FeliCa (registered trademark)) can be employed. The user holds the user terminal 32 over the NFC terminal on the vehicle 20 side, whereby starting state control command information to set the vehicle 20 to the starting-enabled state that is received by the user terminal 32 from the server 10 can be transmitted from the user terminal 32 to the DCM 21. The vehicle 20 is thus switched to the starting-enabled state again. Locking and unlocking of the door lock of the vehicle 20 can be performed similarly through the user terminal 32. In this case, door lock key information is transmitted from the server 10 to the user terminal 32, and the user holds the user terminal 32 over the NFC terminal on the vehicle 20 side, whereby the door lock key information on the vehicle 20 received by the user terminal 32 from the server 10 can be transmitted from the user terminal 32 to the vehicle 20. The user terminal 32 thus can control locking and unlocking of the door lock of the vehicle 20.

Compared with when a starting state control command (door lock key information or starting state control command information for engine starting) is transmitted via communication from the remote control instruction unit 12 to the DCM 21 through the wireless communication network 30, when a starting state control command received from the server 10 is stored in the user terminal 32, locking and unlocking of the door lock and setting the vehicle 20 to the starting-enabled state can be quickly done irrespective of the communication status of the wireless communication network 30 even in the poor communication status, as long as communication has been established between the server 10 and the user terminal 32. The vehicle 20 therefore can be switched to the starting-enabled state quickly and reliably independently of the parking location of the vehicle 20, for example. When the DCM 21 is in the sleep mode, it takes up to one hour or so to switch the vehicle 20 to the starting-enabled state. However, a starting state control command can be directly transmitted to the DCM 21, for example, by holding the user terminal 32 over the NFC terminal on the vehicle 20 side, so that the starting state of the vehicle 20 can be promptly controlled (for example, the vehicle 20 is switched to the starting-enabled state or the door lock key of the vehicle 20 is unlocked) even when the DCM 21 is in the sleep mode.

Even in the system in which the DCM 21 can receive a starting state control command (door lock key information or starting state control command information for engine starting) from the user terminal 32, the DCM 21 may be configured to receive a starting state control command from the server 10. In this case, even when the user has lost or left the user terminal 32 at home, if the user is authenticated and the reservation is confirmed in the server 10 with any other means, a lock command and an unlock command are transmitted to the DCM 21 through the server 10 to enable locking and unlocking of the door lock.

Fourth Embodiment

Figure 7:
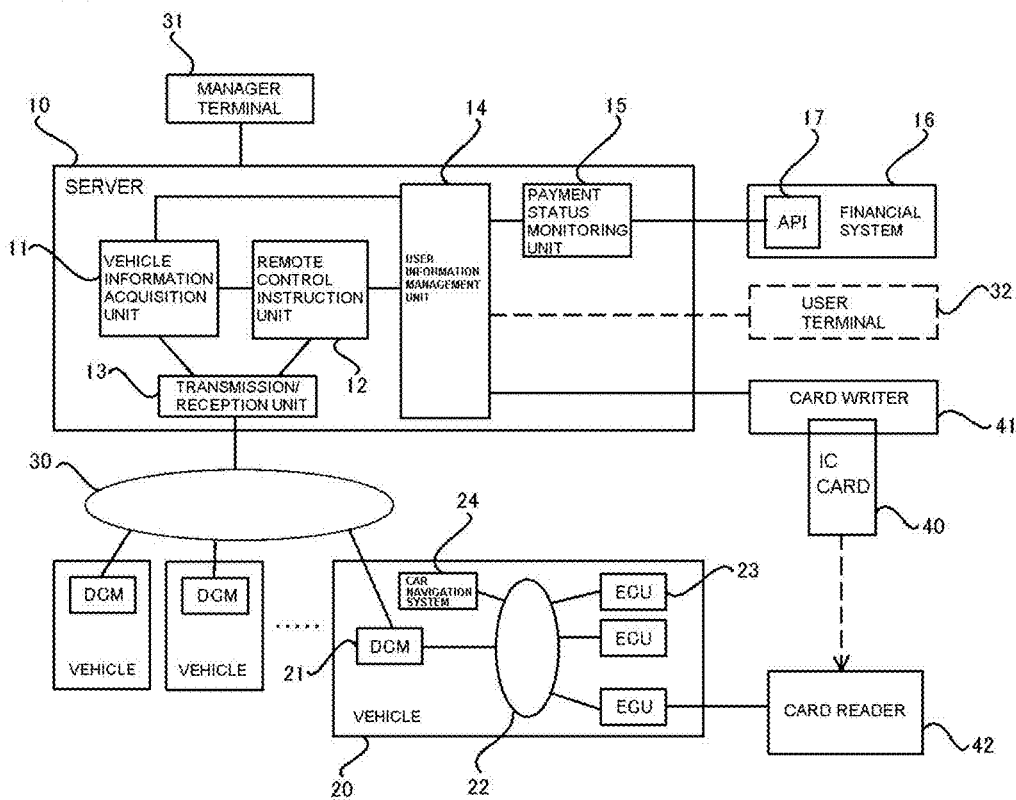
FIG. 7 is a block diagram of a vehicle remote control system in a fourth embodiment.

Referring to FIG. 7, a vehicle remote control system, a communication module, a vehicle, a server, a vehicle remote control method, a vehicle remote control program, and a storage medium according to a fourth embodiment of the present invention will be described. FIG. 7 is an overview of the vehicle starting control system according to the fourth embodiment. The same configuration as in FIG. 1 to FIG. 6 is denoted by the same reference sign and a description thereof is omitted. In the third embodiment, a starting state control command for the vehicle 20 is transmitted to the DCM 21 through the user terminal 32. The fourth embodiment differs from the third embodiment in that a card reader 42 (for example, connected to the door lock ECU 23) on the vehicle 20 side reads a starting state control command from an IC card 40 having the starting state control command written by a card writer 41. In FIG. 7, the user terminal 32 is not an essential configuration.

Control of switching to the starting-enabled state again after switching to the starting disabled state once at A12 in the flowchart in FIG. 3 will be described. At A9, the user is notified that the vehicle is in the starting-disabled state due to the unpaid usage fee and is prompted to pay the predetermined fee by the specified dead line. The process then proceeds to A10. At A10, the payment status monitoring unit 15 monitors the payment status of the user in real time using the API 17 of the financial system 16. At A11, it is determined whether the user of the vehicle has paid the usage fee within the predetermined time limit.

If Yes in the determination at A11 (if the fee has been paid), the process proceeds to A12, and a starting state control command for setting the starting-enabled state again is provided from the server 10 to the DCM 21. In doing so, in the present embodiment, a starting state control command for setting the starting-enabled state again is provided from the server 10 to the DCM 21 through the IC card 40.

Since the payment status monitoring unit 15 monitors the payment status of the user in real time using the API 17 of the financial system 16, the predetermined payment by the user can be grasped in real time, and immediately after the predetermined payment, the user information management unit 14 allows the card writer 41 to write engine starting relay control command information for setting the starting-enabled state into the IC card 40. On the vehicle 20 side, the card reader 42 is provided, and the user holds the IC card 40 over the card reader 42, whereby a starting state control command for setting the starting-enabled state is transmitted from the IC card 40 to the DCM 21, and the DCM 21 switches the vehicle 20 to the starting-enabled state again.

The format of the IC card 40 may be, for example, RFID and NFC. However, the present embodiment is not limited thereto, and IC cards of any kinds can be used. The card writer 41 and the card reader 42 that support the format of the IC card 40 are used. For example, when NFC is used, various types as described above (Type A, Type B, Type F) can be employed.

Compared with when a starting state control command (door lock key information or a starting state control command for engine starting) is transmitted via communication from the remote control instruction unit 12 to the DCM 21 through the wireless communication network 30, when a starting state control command is written in the IC card 40, locking and unlocking of the door lock and setting the vehicle 20 to the starting-enabled state can be quickly done irrespective of the communication status of the wireless communication network 30 even in the poor communication status. When the DCM 21 is in the sleep mode, it takes up to one hour or so to switch the vehicle 20 to the starting-enabled state. However, for example, a starting state control command can be directly transmitted to the DCM 21 by holding the IC card 40 over the card reader 42, so that the starting state of the vehicle 20 can be promptly controlled (for example, the vehicle 20 is switched to the starting-enabled state or the door lock key of the vehicle 20 is unlocked) even when the DCM 21 is in the sleep mode.

Even in the system in which the vehicle 20 is equipped with the card reader 42 and a starting state control command can be input using the IC card 40, means for communicating a starting state control command (door lock key information or a starting state control command for engine starting) from the user terminal 32 to the DCM 21 through short-range wireless means and means for communicating a starting state control command to the DCM 21 through the remote control instruction unit 12 of the server 10 may be provided. In this case, even when the user has lost or left the IC card 40 at home, vehicle starting control can be performed through communication with the DCM 21 using the user terminal 32. If the user is authenticated and the reservation is confirmed in the server 10 using any other communication means, the server 10 transmits a lock command and an unlock command to the DCM 21, so that locking and unlocking of the door lock and the vehicle starting control can be performed. When a plurality of communication means are provided in this manner, locking and unlocking of the door lock and vehicle starting control can be performed using means convenient for the user. This configuration provides a system convenient for the user.

Fifth Embodiment

The first to fourth embodiments are applied to an internal combustion engine vehicle and controls the engine ECU to switch between the starting-disabled state and starting-enabled state. In a fifth embodiment, it is described that the vehicle starting control system in the first to fourth embodiments is applicable to a vehicle using power other than an internal combustion engine vehicle, for example, vehicles including an electric vehicle (hereinafter referred to as "EV") or a hybrid electric vehicle (hereinafter referred to as "HEV").

The kinds of vehicles are classified into an internal combustion engine vehicle, an EV, a parallel HEV, a series HEV, and a series-parallel HEV, also classified according to whether an immobilizer is installed, and further classified into a key type and a push type according to the starting method. The vehicle starting control system in the first to fourth embodiments is applicable to any of those kinds. An immobilizer is a device that allows the engine to start only when authentication is successful. More specifically, a unique ID code is recorded in an IC chip called a transponder embedded in a key, and the ID code of the transponder is authenticated by an ID code registered in the electronic control device of the vehicle body.

The key type and the push type are classification according to the operation method for starting the power. The key type refers to the method in which a key is inserted into the key cylinder to start the power and switch between OFF, ACC, IGN, and START. The push type refers to the method for the smart key type, in which the power-starting push button is pushed to turn on the power.

The HEV is defined as follows. The parallel system is a system that drives wheels with a motor and an engine and charges a battery using the motor. The series system is a system that drives an electric generator with an engine for charging and drives wheels with a motor. The series-parallel system is a system that drives wheels with a motor and an engine and drives an electric generator with the engine for charging to drive the motor.

Here, the configuration of the DCM 21 for the EV and HEV is similar to the one for the internal combustion engine vehicle illustrated in the first to fourth embodiments. However, the configuration is different from that of the internal combustion engine vehicle in that the EV does not have an internal combustion engine and the HEV has a mode of running only with a motor. In the case of the EV, it is preferable that means for detecting that the push button is pushed and the power is on is provided in place of the IGN input detecting unit, and the starting state control command can be processed by software. In the case of the HEV, it is preferable that means for detecting that the power is on is provided in place of the IGN input detecting unit, and the starting state control command can be processed by software. For example, a key-type EV does not exist and all EVs are of the push type.

Specific examples of the starting-disabled state include cutting off electric power supply to the cell motor, controlling the immobilizer to invalid authentication of an ID code, and disabling notification to the electronic control device that the push button has been pressed. In any configuration, the starting state control command can be executed by software.

The invention claimed is:

1. A vehicle remote control system comprising:
a communication module; and
a server, wherein
the server includes
remote control instruction means for outputting a starting state control command for commanding to switch a starting state of a vehicle between a starting-disable state and a starting-enabled state to the communication module,
the communication module is connected to an ECU of the vehicle via a vehicle-mounted network,
the communication module is configured to acquire vehicle information of the vehicle detected by a vehicle-mounted sensor connected to the ECU,
the communication module is configured to acquire position information of the vehicle acquired by a vehicle-mounted GPS connected to the ECU,
the communication module is configured to switch the starting state of the vehicle between the starting-disable state and the starting-enabled state by transmitting the starting state control command to the ECU, and
the communication module is configured to determine to switch the starting state of the vehicle in response to the starting state control command,
when judging that the power of the vehicle is off based on the vehicle information, judging that the vehicle is stopped based on the vehicle information, and judging that the vehicle is not stopped on a public road based on the vehicle information or the position information; or
when judging that power of the vehicle is off based on the vehicle information, judging that the vehicle is stopped based on the vehicle information, and judging that the vehicle is stopped at a predetermined parking area based on the position information.

2. A communication module mounted on a vehicle, wherein
the communication module is connected to an ECU of the vehicle via a vehicle-mounted network,
the communication module is configured to acquire vehicle information of the vehicle detected by a vehicle-mounted sensor connected to the ECU,
the communication module is configured to acquire position information of the vehicle acquired by a vehicle-mounted GPS connected to the ECU,
the communication module is configured to switch a starting state of the vehicle between a starting-disable state and a starting-enabled state by transmitting a starting state control command to the ECU, and
the communication module is configured to determine to switch the starting state of the vehicle in response to the starting state control command,
when judging that the power of the vehicle is off based on the vehicle information, judging that the vehicle is stopped based on the vehicle information, and judging that the vehicle is not stopped on a public road based on the vehicle information or the position information; or
when judging that power of the vehicle is off based on the vehicle information, judging that the vehicle is stopped based on the vehicle information, and judging that the vehicle is stopped at a predetermined parking area based on the position information.

3. The communication module according to claim 2, wherein
the communication module judges that the vehicle is stopped when at least one of the following conditions is satisfied:
(1-1) a door of the vehicle being locked;
(1-2) the vehicle carrying no passengers;
(1-3) a parking brake of the vehicle being at a parking position;
(1-4) an in-vehicle camera in the vehicle not detecting a person; or
(1-5) a human detection sensor in the vehicle not detecting a person.

4. The communication module according to claim 2, wherein
the communication module judges that the vehicle is not stopped on the public road,
when judging that a predetermined road lane is not detected based on the vehicle information; or
when judging that the vehicle is not stopped on a public road on a map based on the position information.

5. The communication module according to claim 2, wherein
the communication module judges that the vehicle is stopped at the predetermined parking area,
when judging that the vehicle is stopped at a predetermined parking area on a map; or
when judging that the vehicle is stopped at a predetermined parking area on a map based on the position information; or
when judging that the vehicle is stopped at a predetermined parking area based on GeoFence connected to the ECU.

6. The communication module according to claim 2, wherein the communication module is further configured to receive the starting state control command through a user terminal or an IC card.

7. A vehicle comprising the communication module according to claim 2.

8. A server configured to compute a starting state control command for switching between a starting-disabled state and a starting-enabled state of a vehicle based on vehicle information on the vehicle received from a communication module, the serve comprising:
vehicle information acquisition means for acquiring the vehicle information from the communication module; and
remote control instruction means for computing the starting state control command using the vehicle information acquired by the vehicle information acquisition means and outputting the starting state control command to the communication module,
wherein the server is configured to determine to switch the starting state of the vehicle, when judging that the power of the vehicle is off based on the vehicle information, judging that the vehicle is stopped based on the vehicle information, and judging that the vehicle is not stopped on a public road based on the vehicle information or the position information.

9. A vehicle remote control method comprising the steps of:
(A) outputting, at a server, a starting state control command for commanding to switch a starting state of a vehicle between a starting-disable state and a starting-enabled state to a communication module connected to an ECU of the vehicle via a vehicle-mounted network,
(B) acquiring, at the communication module, vehicle information of the vehicle detected by a vehicle-mounted sensor connected to the ECU,
(c) acquiring, at the communication module, position information of the vehicle acquired by a vehicle-mounted GPS connected to the ECU, and
(D) switching, at the communication module, the starting state of the vehicle between the starting-disable state and the starting-enabled state by transmitting the starting state control command to the ECU, wherein
the communication module determines to switch the starting state of the vehicle in response to the starting state control command,
when judging that the power of the vehicle is off based on the vehicle information, judging that the vehicle is stopped based on the vehicle information, and judging that the vehicle is not stopped on a public road based on the vehicle information or the position information; or
when judging that power of the vehicle is off based on the vehicle information, judging that the vehicle is stopped based on the vehicle information, and judging that the vehicle is stopped at a predetermined parking area based on the position information.

* * * * *